(12) United States Patent
Yuasa et al.

(10) Patent No.: US 12,466,969 B2
(45) Date of Patent: Nov. 11, 2025

(54) AQUEOUS INK, INK CARTRIDGE AND INK JET RECORDING METHOD

(71) Applicant: CANON KABUSHIKI KAISHA, Tokyo (JP)

(72) Inventors: Hirohiko Yuasa, Kanagawa (JP); Daiji Okamura, Tokyo (JP); Satoru Kobayashi, Kanagawa (JP); Saki Tasaki, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 184 days.

(21) Appl. No.: 18/187,491

(22) Filed: Mar. 21, 2023

(65) Prior Publication Data

US 2023/0312957 A1    Oct. 5, 2023

(30) Foreign Application Priority Data

Mar. 30, 2022   (JP) .................................. 2022-056596
Mar. 9, 2023   (JP) .................................. 2023-036748

(51) Int. Cl.
*C09D 11/322*    (2014.01)
*C09D 11/38*    (2014.01)

(52) U.S. Cl.
CPC ............ *C09D 11/322* (2013.01); *C09D 11/38* (2013.01)

(58) Field of Classification Search
CPC ....... C09D 11/322; C09D 11/38; C09D 11/10; C09D 11/107; C09D 11/037; C09D 11/326; C09D 11/30; B41J 2/2107; B41J 2/01; B41J 2/21
See application file for complete search history.

(56) References Cited

U.S. PATENT DOCUMENTS

2019/0264052 A1*   8/2019   Loccufier ............. C09D 11/102
2022/0169034 A1*   6/2022   Hagiwara ............. C09D 11/40

FOREIGN PATENT DOCUMENTS

JP   2003026964 A   1/2003
JP   2021008598 A   1/2021

* cited by examiner

*Primary Examiner* — Jannelle M Lebron
(74) *Attorney, Agent, or Firm* — Canon U.S.A., Inc. IP Division

(57) ABSTRACT

An aqueous ink containing a pigment (C.I. Pigment Yellow 101) and a resin dispersant for the pigment. The resin dispersant has a unit with an aromatic group and a unit with an anionic group.

20 Claims, 2 Drawing Sheets

AQUEOUS INK, INK CARTRIDGE AND INK JET RECORDING METHOD

BACKGROUND OF THE INVENTION

Field of the Invention

The present disclosure relates to an aqueous ink an ink cartridge and an ink jet recording method.

Description of the Related Art

One of the needs in the printing industry is the production of a recorded material of an attractive bright color. For example, posters, point of purchase (POP) displays and packages of food and beverage products are required to be recorded in bright colors to attract customers' eyes. In particular, an image with high lightness in a yellow region tends to attract attention. Furthermore, recording an image with high lightness in a yellow region can greatly expand the color gamut that can be expressed. Thus, in the printing industry, there is a strong demand for recording an image with high lightness in a yellow region. A fluorescent color can be used to meet the demand.

At present, offset printing is mainly used as a method for recording a fluorescent color image. Bright chromaticity typically requires overprinting twice or more. This sometimes results in insufficient productivity.

Furthermore, digital recording with an electrophotographic system can record a fluorescent color image with high color development using liquid toner. However, the electrophotographic system has restrictions on recording media. The system is difficult, for example, to apply to textile recording, to rasterize an image into a large format or to apply to a thick material.

On the other hand, ink jet recording can be applied to various recording media by taking advantage of the fact that a recording head for ejecting ink does not come into contact with recording media (a non-contact mode). However, the ink must be stably ejected from a fine nozzle, and this tends to impose restrictions on the physical properties of the ink. In particular, materials that affect the performance of the ink, such as coloring materials and resins, are mostly solids. Despite trying to add a sufficient amount of fluorescent coloring material to the ink to record an image with high chromaticity, there are restriction for the above reasons.

To solve the above disadvantages, as described in Japanese Patent Laid-Open No. 2003-026964, there has been proposed a fluorescent ink for ink jet recording that contains a resin particle composed of a core containing a fluorescent coloring material and a polymer, and, a shell made of a polymer with a hydrophilic group surrounding the core, a water-soluble organic solvent and water.

SUMMARY OF THE INVENTION

The present inventors have studied an aqueous ink proposed in Japanese Patent Laid-Open No. 2003-026964. It has been found that it is difficult to achieve both high ejection stability and storage stability and the ability of recording an image with high chromaticity in a yellow region.

Thus, the present disclosure provides an aqueous ink for ink jet recording with high ejection stability and storage stability for recording an image with high chromaticity in a yellow region, an ink cartridge containing the aqueous ink and an ink jet recording method.

An aqueous ink according to the present disclosure is an aqueous ink for ink jet recording containing a pigment and a resin dispersant for the pigment, wherein the pigment is C.I. Pigment Yellow 101 and the resin dispersant has a unit with an aromatic group and a unit with an anionic group.

Further features of the present disclosure will become apparent from the following description of exemplary embodiments with reference to the attached drawings.

DESCRIPTION OF THE EMBODIMENTS

Figure 1:
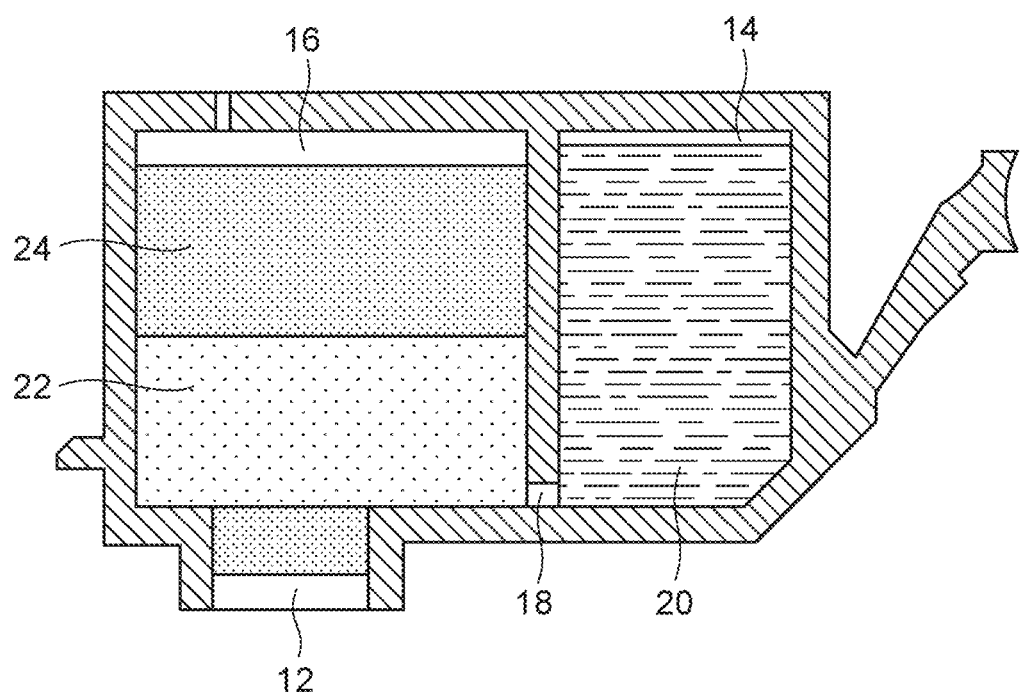
FIG. 1 is a cross-sectional view schematically illustrating an exemplary embodiment of an ink cartridge of the present disclosure.

The present disclosure is further described in the following preferred exemplary embodiments. In the present disclosure, when the compound is a salt, the salt is present in an ink in a state of being dissociated into ions, but it is expressed as "the ink contains the salt" for convenience. "C.I." is an abbreviation for "color index", A "unit" of a resin is the smallest repeating unit constituting the resin and refers to a structure formed by (co)polymerization of one monomer. An aqueous ink for ink jet recording may be simply referred to as an "ink". Unless otherwise specified, physical properties mentioned herein are determined at room temperature (25 C).

The present inventors have studied an ink with high ejection stability and storage stability for recording an image with high chromaticity in a yellow region. First, with respect to a yellow ink typically used as a basic color in the ink jet field, the present inventors examined the chromaticity of an image recorded with an ink containing a yellow pigment. As a result, an image with high chromaticity in a yellow region could not be recorded. This is because the pigment contained in the yellow ink of the basic color (for example, C.I. Pigment Yellow 74) is not a fluorescent coloring material. To record an image with high chromaticity in a yellow region, as described above, the ink should contain a fluorescent coloring material. The fluorescent coloring material is a coloring material that reflects light with a wavelength in the visible light region under daylight (sunlight) and that absorbs daylight and emits (fluoresces) light with a wavelength in the visible light region. When the color of an image recorded with an ink containing a coloring material other than fluorescent coloring materials is measured, the maximum reflected light intensity at the maximum absorption wavelength in the wavelength range of 400 to 700 nm is less than 100%. On the other hand, when the color of an image recorded with an ink containing a fluorescent coloring material is measured, the maximum reflected light intensity is 100% or more due to fluorescence in addition to the reflected light. Thus, recording with an ink containing a fluorescent coloring material can provide an image with high chromaticity. Fluorescent coloring materials are broadly divided into four types: fluorescent dyes, resin particles dyed with fluorescent dyes, plastic fluorescent pigments and fluorescent pigments of an organic pigment type (organic fluorescent pigments). Thus, the present inventors have studied coloring materials to be contained to produce an ink with high ejection stability and storage stability.

First, the present inventors tried to add a dye with fluorescence (fluorescent dye) among fluorescent coloring materials to ink. However, it has been found that an increased, amount of fluorescent dye added to record an image with high chromaticity improves the chroma of the image but significantly reduces the lightness and cannot provide an image with high chromaticity. This is probably due to concentration quenching characteristic of fluorescent materials. "Concentration quenching" refers to a phenomenon in which the fluorescence intensity decreases when the density of a fluorescent coloring material exceeds a certain level.

Next, an attempt was made to add a resin particle dyed with a fluorescent dye to ink. It has been found that dyeing a resin particle with a fluorescent dye fixes the fluorescent dye to the resin particle and can reduce the decrease in lightness of an image. In particular, it has been found that a resin particle dyed with a fluorescent dye with a strong interaction can be used to record an image with high chromaticity in a yellow region, to record an image with high chromaticity and to achieve high ejection stability. However, it has been found that a fluorescent dye is separated from a resin particle while the ink is stored and this results in low storage stability.

Another attempt was made to add a plastic fluorescent pigment to ink. A plastic fluorescent pigment is produced by dyeing a resin with a fluorescent dye and pulverizing and processing the resin into a fine particle, and has a particle size on the order of micrometers. As a result, it has been found that a plastic fluorescent pigment has a large particle size, even though the pigment was pulverized, and low water dispersibility. So, it is difficult to apply to an aqueous ink for ink jet recording.

A final attempt was made to add a fluorescent pigment of the organic pigment type to ink. A fluorescent pigment of the organic pigment type refers to a pigment that emits fluorescence among pigments with an organic molecular component. A fluorescent pigment of the organic pigment type with a hue in the yellow region may be C.I. Pigment Yellow 101 or 9,10-dianilinoanthracene. The present inventors have evaluated various properties of ink depending on the type of resin dispersant. It has been found that C.I. Pigment Yellow 101 and a resin dispersant with a specific unit can be used to achieve high ejection stability and storage stability and to record an image with high chromaticity in a yellow region. The mechanism by which the ink containing the pigment and the resin dispersant for the pigment improves the ejection stability storage stability and image chromaticity may be as described below.

C.I. Pigment Yellow 101 (hereinafter also referred to simply as a pigment) has a structure with a naphthalene skeleton in the molecule. The naphthalene skeleton has a structure in which two benzene rings share a single carbon-carbon bond. Thus, the resin dispersant (hereinafter also referred to simply as a resin) can be strongly adsorbed on the pigment due to the interaction between the naphthalene skeleton on the surface of the pigment particle and $\pi$ electrons of the aromatic group of the resin. Electrostatic repulsion between anionic groups of the resin adsorbed on the surface of the pigment particle can reduce the aggregation of the pigment. Furthermore, as described above, the resin is strongly adsorbed on the pigment. This can reduce not only the aggregation of the pigment near an ejection port but also the separation of the resin from the pigment during storage of the ink and can improve ejection stability and storage stability. Furthermore, due to electrostatic repulsion between anionic groups of the resin, the distance between pigment particles is sufficiently maintained even on a recording medium. This can prevent concentration quenching and improve image chromaticity even at an increased pigment content.

Like C.I. Pigment Yellow 101, a fluorescent pigment of the organic pigment type 9,10-dianilinoanthracene has an anthracene skeleton in the molecule and therefore has a strong $\pi$-$\pi$ interaction between the molecules. The pigment is therefore more easily agglomerated than C.I. Pigment Yellow 101. Consequently, even dispersed with the resin, the pigment aggregates on a recording medium, and a short distance between pigment particles causes concentration quenching. Consequently, an image with high chromaticity cannot be recorded.

When the resin has no unit with an aromatic group, the resin is easily separated from the surface of the pigment particle. This results in no electrostatic repulsion between anionic groups of the resin, an unstably dispersed pigment particle and low ejection stability and storage stability. This also results in a short distance between pigment particles on a recording medium and causes concentration quenching. Consequently, an image with high chromaticity cannot be recorded. When the resin has no unit with an anionic group, the resin adsorbed on the surface of the pigment particle has no electrostatic repulsion. Thus, the pigment cannot be stably dispersed, and high ejection stability and storage stability cannot be achieved. This also results in a short distance between pigment particles on a recording medium and causes concentration quenching. Consequently, an image with high chromaticity cannot be recorded.

<Aqueous Ink>

The ink disclosed herein is an aqueous ink for ink jet recording containing a pigment and a specific resin dispersant. Components constituting an ink according to the present disclosure and the physical properties of the ink are described in detail below. The terms "(meth)acrylic acid", "(meth)acrylate" and "(meth)acryloyl" represent "acrylic acid, methacrylic acid", "acrylate, methacrylate" and "acryloyl, methacryloyl", respectively.

C.I. Pigment Yellow 101

The ink contains C.I. Pigment Yellow 101 as a coloring material (pigment). The pigment content (% by mass) of the ink is preferably 0.5% by mass or more to 15.0% by mass or less based on the total mass of the ink. A pigment content of less than 0.5% by mass may be too low to achieve sufficient image chromaticity. A pigment content of more than 15.0% by mass may be too high to achieve sufficient ejection stability due to easy clogging near an ejection port of a recording head.

The pigment preferably has a crystallite size of 30 nm or more. The crystallite size of a pigment can be determined by measuring the half-value width of a diffraction peak from an X-ray diffraction (XRD) spectrum and by using the Scherrer equation ($L = K\lambda/\beta \cos\theta$, L: crystallite size [nm], K: Scherrer constant, $\lambda$; X-ray wavelength [nm], $\beta$: full width at half maximum, $\theta$: glancing angle [rad]). An XRD spectrum can be measured, with an X-ray diffractometer. A pigment with a crystallite size of less than 30 nm may have low fluorescence intensity, thus resulting in a recorded image with low lightness and insufficient chromaticity. The pigment preferably has a crystallite size of 100 nm or less.

The pigment preferably has an aspect ratio of 3.0 times or less. The aspect ratio of a pigment is an average value of the ratio of the major diameter to the minor diameter (the major diameter/the minor diameter) of the pigment particle approximated to an ellipse. A pigment particle with an aspect ratio of more than 3.0 times has a rod-like shape and is aligned in the long side direction on a recording medium, thus resulting in a short distance between particles. This may result in concentration quenching and a recorded image with low lightness and insufficient chromaticity. The pigment preferably has an aspect ratio of 1.1 times or more. A pigment particle with an aspect ratio of less than 1.1 times has a nearly spherical shape and is likely to be densely packed on a recording medium, thus sometimes resulting in a short distance between pigment particles. This may result in concentration quenching and a recorded image with low lightness and insufficient chromaticity. The aspect ratio of a pigment can be calculated by averaging the measured values of 100 or more pigment particles measured with a scanning electron microscope.

The pigment preferably has a cumulative 50% particle size ($D_{50}$, hereinafter also referred to as an average particle size) of 200 nm or less on a volume basis. The cumulative 50% particle size of a pigment on a volume basis is the diameter of a particle at an integrated value of 50% of the total volume of particles measured from the smallest particle size in a particle size cumulative curve. A pigment with an average particle size of more than 200 nm may provide an image with insufficient chromaticity. The pigment preferably has an average particle size of 40 nm or more. The average particle size of a pigment can be measured with a particle size analyzer utilizing a dynamic light scattering method (for example, trade name "UPA-EX150", manufactured by Nikkiso Co., Ltd.). The measurement conditions are, for example, SetZero: 30 seconds, the number of measurements: 3 times and the measurement time: 180 seconds. As a matter of course, the particle size distribution analyzer and the measurement conditions to be used are not limited to those described above.

The pigment preferably has a span value of 1.0 time or more to 3.0 times or less. The span value S of a pigment can be calculated using the formula $S=(D_{90}-D_{10})/D_{50}$ by measuring the cumulative 10% particle size on a volume basis ($D_{10}$), the cumulative 50% particle size on a volume basis ($D_{50}$) and the cumulative 90% particle size on a volume basis ($D_{90}$) of the pigment. The span value represents the particle size distribution. A smaller span value indicates a narrower particle size distribution, and a larger span value indicates a wider particle size distribution. A pigment with a span value of less than 1.0 time has a narrow particle size distribution, has an almost uniform particle size, and therefore tends to have a short distance between pigment particles on a recording medium. This may result in concentration quenching and a recorded image with low lightness and insufficient chromaticity. A pigment with a span value of more than 3.0 times has a wide particle size distribution, has many coarse particles, and may therefore have insufficient ejection stability due to easy clogging near an ejection port of a recording head.

The amount (% by mass) of the resin dispersant contained in the aqueous ink is preferably 0.05 times or more to 2.00 times or less the amount (% by mass) of the pigment contained in the aqueous ink in terms of a mass ratio. A mass ratio of less than 0.05 times may result in too little resin dispersant, insufficient electrostatic repulsion and an unstably dispersed pigment. This may result in insufficient ejection stability, storage stability and image chromaticity. A mass ratio of more than 2.00 times may result in too much resin dispersant, an easily increased ink viscosity and insufficient ejection stability.

The pigment can be dispersed by any known dispersion method. The dispersion method may be a media dispersion method using a ball mill, a sand mill, a rolling mill, a bead mill or a paint shaker, or a medialess dispersion method using an ultrasonic homogenizer or a high-pressure homogenizer. Among these, a bead mill, a sand mill and a high-pressure homogenizer can be used to easily control the crystallite size, the aspect ratio and the span value of a pigment in a preferred range. On the other hand, it is difficult for a paint shaker or an ultrasonic homogenizer to control the crystallite size, the aspect ratio and the span value of a pigment in a preferred range even if conditions, such as the treatment time, are changed. When a bead mill or a sand mill is used to adjust the aspect ratio in the above range, beads with a diameter of 0.07 mm or more to 0.39 mm or less are preferably used.

Resin Dispersant

An ink contains a resin (resin dispersant) having a unit with an aromatic group and a unit with an anionic group. Thus, the ink contains a resin-dispersed pigment as a pigment. The resin dispersant content (% by mass) of the ink is preferably 0.025% by mass or more to 30.0% by mass or less, more preferably 0.1% by mass or more to 20.0% by mass or less, particularly preferably 0.1% by mass or more to 15.0% by mass or less, based on the total mass of the ink.

The resin may be a block copolymer, a random copolymer, a graft copolymer or a combination thereof. The resin may be a water-soluble resin that can be dissolved in an aqueous medium or a resin particle dispersed in an aqueous medium. The resin particle does not need to contain a coloring material. In particular, the resin used as the resin dispersant can be a water-soluble resin.

In the present specification, the phrase "resin is water-soluble" means that, when neutralized with an alkali in an amount equivalent to the acid value, the resin is present in an aqueous medium without a particle with a particle size measurable by a dynamic light scattering method. Whether the resin is water-soluble can be determined by the following method. First, a liquid (resin solid content: 10% by mass) containing a resin neutralized with an alkali (sodium hydroxide, potassium hydroxide, or the like) equivalent to the acid value is prepared. The prepared liquid is then diluted 10 times (on a volume basis) with pure water to prepare a sample solution. When the particle size of the resin in the sample solution is measured by the dynamic light scattering method, if a particle with a particle size is not observed, it can be determined that the resin is water-soluble.

The resin used as the resin dispersant may be an acrylic resin, a urethane resin or a urea resin. In particular, an acrylic resin can be used. The resin used as the resin dispersant has at least a unit with an aromatic group and a unit with an anionic group. In an acrylic resin, a monomer with an aromatic unit can have one polymerizable functional group, such as an ethylenically unsaturated bond, in the molecule. Specific examples thereof include styrene, α-methylstyrene and benzyl (meth)acrylate. The anionic group may be a carboxylic acid group, a phenolic hydroxy group or a phosphate group. In particular, a carboxylic acid group can be used. A monomer with a carboxylic acid group can be a monomer with one polymerizable functional group, such as an ethylenically unsaturated bond, in the molecule. Examples thereof include monomers, such as (meth)acrylic acid, itaconic acid, maleic acid and fumaric acid, and salts and anhydrides thereof. Examples of cations constituting the salts include lithium, sodium, potassium, ammonium and organic ammonium ions. A monomer with a carboxylic acid group can have no aromatic or cyano group. A monomer with a carboxylic acid group preferably has a molecular weight of 300 or less, more preferably 200 or less. In particular, (meth)acrylic acid can be used. The resin may contain a hydrophilic or hydrophobic unit other than those described above to improve adsorption on the surface of the pigment particle and the storage stability of the ink.

The hydrophilic unit is a unit with a hydrophilic group, such as a hydroxy group or an ethylene oxide group. The hydrophilic unit can be formed, for example, by polymerizing a hydrophilic monomer with a hydrophilic group. The hydrophilic monomer may be 2-hydroxyethyl (meth)acrylate or (poly)ethylene glycol (meth)acrylate. The hydrophobic unit is a unit without a hydrophilic group, such as an anionic group, a hydroxy group or an ethylene oxide group. The hydrophobic unit can be formed, for example, by polymerizing a hydrophobic monomer without the hydrophilic group. The hydrophobic monomer may be a (meth)acrylate monomer, such as ethyl (meth)acrylate, methyl (meth)acrylate, butyl (meth)acrylate or 2-ethylhexyl (meth)acrylate.

The resin (resin dispersant) preferably has an acid value (mg KOH/g) of 50 mg KOH/g or more to 200 mg KOH/g or less. A resin dispersant with an acid value of less than 50 mg KOH/g may have too few anionic groups to have sufficient electrostatic repulsion and may unstably disperse the pigment. This may result in insufficient ejection stability, storage stability and image chromaticity. A resin dispersant with an acid value of more than 200 mg KOH/g cannot be easily adsorbed on the surface of a hydrophobic pigment particle and sometimes cannot stably disperse the pigment. This may result in insufficient ejection stability, storage stability and image chromaticity.

The resin (resin dispersant) preferably has a weight-average molecular weight Mw of 1,000 or more to 30,000 or less, A resin dispersant with a weight-average molecular weight of less than 1,000 is too small to have sufficient repulsion due to steric hindrance even if the resin is adsorbed on the surface of the pigment particle, and sometimes cannot stably disperse the pigment. This may result in insufficient ejection stability, storage stability and image chromaticity. A resin dispersant with a weight-average molecular weight of more than 30,000 may increase the ink viscosity. This may result in insufficient ejection stability.

Provided that ejection stability, storage stability and the image chromaticity of an image are not impaired, a resin other than resins having a unit with a carboxylic acid group and a unit with an aromatic group may be added to the ink. The other resin content (% by mass) of the ink is preferably 0.1% by mass or more to 5.0% by mass or less based on the total mass of the ink.

The physical properties of a resin (resin dispersant) can be measured as described below. The type of a unit constituting a resin in ink can be determined by analyzing the resin with a high-temperature gas chromatograph/mass spectrometer (high-temperature GC/MS). The molecular weight and type of a monomer constituting each unit can be determined by quantitative analysis using a nuclear magnetic resonance method ($^{13}$C-NMR) or using a Fourier transform infrared spectrophotometer (FT-IR). To increase the accuracy of the analysis of the resin in an ink, a sediment and a supernatant liquid prepared by centrifuging the ink can be used instead of using the ink as it is. For example, an excessive amount of acid (hydrochloric acid or the like) may be added to a supernatant liquid prepared by centrifuging the ink at 75,000 rpm, and the resin thus precipitated may be dried and used.

Compound Represented by General Formula (1), Compound Represented by General Formula (2)

The ink can contain at least one of a compound represented by the general formula (1) and a compound represented by the general formula (2). In other words, the ink can contain at least one compound selected from the group consisting of the compounds represented by the general formula (1) and the compounds represented by the general formula (2). The compound can form a hydrogen bond with a hydroxy group of the pigment and can thereby be present near the surface of the pigment particle. This can reduce the aggregation of the pigment and can maintain a sufficient distance between pigment particles on a recording medium. This can reduce concentration quenching and further improve image chromaticity.

The amount (% by mass) of compound represented by the general formula (1) in the ink is preferably 0.01% by mass or more to 5.0% by mass or less based on the total mass of the ink. In the general formula (1), $R_1$, $R_2$, $R_3$ and $R_4$ independently denote a hydrogen atom or an alkyl group having 1 to 5 carbon atoms. The alkyl group having 1 to 5 carbon atoms may be a linear or branched alkyl group, more specifically, a methyl group, an ethyl group, a n-propyl group, an i-propyl group, a n-butyl group, an i-butyl group or a n-pentyl group. In particular, $R_1$ and $R_3$ can be an i-butyl group and a methyl group. $R_2$ and $R_4$ can be also an i-butyl group and a methyl group. $R_5$ and $R_6$ independently denote an alkylene group having 1 to 5 carbon atoms. Thus, $R_5O$ and $R_6O$ independently denote an alkylene oxide group. In particular, $R_5$ and $R_6$ independently denote an ethylene group, and $R_5O$ and $R_6O$ independently denote an ethylene oxide group. m and n independently denote an integer of 0 or more. Either m or n may be 0, or both may be 0. Preferably, m+n is 25 or less. In particular, m+n is preferably 10.

The amount (% by mass) of compound represented by the general formula (2) in the ink is preferably 0.1% by mass or more to 50.0% by mass or less based on the total mass of the ink. In general formula (2), $R_7$ denotes an alkylene group having 2 to 6 carbon atoms. When $R_7$ denotes an alkylene group having 2 carbon atoms, p preferably denotes an integer of 2 or more and an integer of 25 or less. When $R_7$ is not an alkylene group having 2 carbon atoms, p preferably denotes an integer of 1 or more and an integer of 25 or less. When $R_7$ denotes an ethylene group, a compound represented by the general formula (2) may be a low-molecular-weight compound, such as diethylene glycol or triethylene glycol, or poly(ethylene glycol) with a molecular weight of approximately 1,000. In particular, triethylene glycol can be used.

The present inventors have found that a compound in which $R_7$ denotes an alkylene group having 2 carbon atoms and p is 1 (ethylene glycol) cannot sufficiently improve image chromaticity. This is probably because the aggregation of the pigment particle cannot be sufficiently reduced due to the short molecular chain. Specific examples of a compound represented by the general formula (2) also include propylene glycol butylene glycol, 1,2-pentanediol, 1,5-pentanediol, 1,2-hexanediol and 1,6-hexanediol. These compounds may be used in combination.

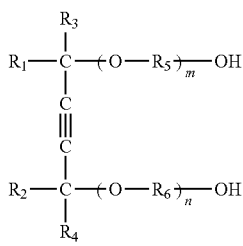

(1)

In general formula (1), $R_1$, $R_2$, $R_3$ and $R_4$ independently denote a hydrogen atom or an alkyl group having 1 to 5 carbon atoms. $R_5$ and $R_6$ independently denote an alkylene group having 1 to 5 carbon atoms. m and n independently denote an integer of 0 or more.

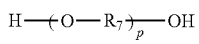

(2)

In general formula (2), $R_7$ denotes an alkylene group having 2 to 6 carbon atoms, p denotes an integer of 2 or more when $R_7$ denotes an alkylene group having 2 carbon atoms, or denotes an integer of 1 or more when $R_7$ denotes an alkylene group other than the alkylene group having 2 carbon atoms.

Compound Represented by General Formula (3)

The ink can contain a compound represented by the general formula (3). This compound has a molecular structure similar to the molecular skeleton (naphthalene skeleton) of the pigment C.I. Pigment Yellow 101 and can therefore be present near the surface of the pigment particle due to hydrophobic interaction. This can reduce the aggregation of the pigment and can maintain a sufficient distance between pigment particles on a recording medium. This can efficiently reduce concentration quenching. Furthermore, C.I. Pigment Yellow 101 absorbs fluorescence emitted by a compound represented by the general formula (3) and can thereby emit fluorescence with increased intensity. This can improve the lightness of a recorded image and further improve image chromaticity. A compound in which $R_8$ in the general formula (3) is a hydrogen atom is 2-naphthol, and a compound in which $R_8$ is a formyl group is 2-hydroxy-1-naphthaldehyde.

The amount of compound represented by the general formula (3) in the ink is preferably 5 ppm or more to 5,000 ppm or less based on the pigment content. The amount of compound represented by the general formula (3) in the ink is calculated using the formula described below. Less than 5 ppm of a compound represented by the general formula (3) in the ink is too little to sufficiently produce the above effects and may result inn insufficient image chromaticity. More than 5,000 ppm of a compound represented by the general formula (3) in the ink may adhere to the vicinity of an ejection port of a recording head and cause clogging, thus resulting in insufficient ejection stability.

Amount of compound represented by general formula (3) in ink (ppm)=[Amount of compound represented by general formula (3)(% by mass)/pigment content (% by mass)]×1,000,000

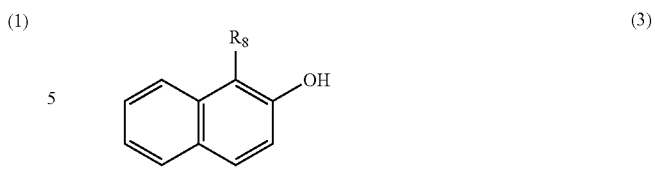

(3)

In the general formula (3), $R_8$ denotes a hydrogen atom or a formyl group.

Aqueous Medium

The ink is an aqueous ink containing water as an aqueous medium. The ink may contain water or an aqueous medium that is a mixed solvent of water and a water-soluble organic solvent. The water can be deionized water (ion-exchanged water). The water content (% by mass) of the ink is preferably 50.0% by mass or more to 95.0% by mass or less based on the total mass of the ink.

The water-soluble organic solvent is not particularly limited as long as the solvent is water-soluble (the solvent can dissolve in water at any ratio at 25° C.). More specifically, other alcohols, other alkylene glycols, glycol ethers, nitrogen-containing polar compounds and sulfur-containing polar compounds can be used. The water-soluble organic solvent content (% by mass) of the ink is preferably 3.0% by mass or more to 50.0% by mass or less, more preferably 10.0% by mass or more to 40.0% by mass or less, based on the total mass of the ink. A water-soluble organic solvent content (% by mass) of less than 3.0% by mass may result in solidification of the ink in an ink jet recording apparatus and insufficient sticking resistance. A water-soluble organic solvent content (% by mass) of more than 50.0% by mass may result in the ink with too high viscosity and low fluidity and result in inadequate supply of the ink.

Other Additive Agents

The ink may contain, in addition to the additive agents described above, other additive agents, such as another surfactant, a pH adjuster, an anticorrosive, a preservative, a fungicide, an antioxidant, a reducing inhibitor, an evaporation promoter and/or a chelating agent, if necessary. In particular, the ink can contain a surfactant. The surfactant content (% by mass) of the ink is preferably 0.1% by mass or more to 5.0% by mass or less, more preferably 0.1% by mass or more to 2.0% by mass or less, based on the total mass of the ink. The surfactant may be an anionic surfactant, a cationic surfactant or a nonionic surfactant. In particular, a nonionic surfactant with a low affinity for the pigment can be used to adjust various physical properties of the ink.

Physical Properties of Ink

The ink is an aqueous ink applied to an ink jet system and can have physical properties appropriately adjusted for the ink jet system. More specifically, the ink preferably has a surface tension of 20 mN/m or more to 60 mN/m or less, more preferably 25 mN/m or more to 45 mN/m or less, as measured by a plate method at 25° C. The ink preferably has a viscosity of 1.0 mPa·s or more to 10.0 mPa·s or less, more preferably 1.0 mPa·s or more to 5.0 mPa·s or less, at 25° C. The ink preferably has a pH of 7.0 or more to 10.0 or less at 25° C. The pH of the ink can be measured with a typical pH meter equipped with a glass electrode.

<Ink Cartridge>

An ink cartridge according to the present disclosure has an ink and an ink storage portion containing the ink. The ink in the ink storage portion is an aqueous ink according to the present disclosure described above. FIG. 1 is a cross-sectional view schematically illustrating an exemplary embodiment of an ink cartridge of the present disclosure. As illustrated in FIG. 1, the ink cartridge has, on the bottom face, an ink supply port 12 for supplying the ink to a recording head. The ink cartridge has the ink storage portion containing the ink. The ink storage portion includes an ink storage chamber 14 and an absorber compartment 16, which communicate with each other through a connection port 18. The absorber compartment 16 communicates with the ink supply port 12. The ink storage chamber 14 contains a liquid ink 20, and the absorber compartment 16 holds absorbers 22 and 24 for containing the ink in an impregnated state. The ink storage portion may have no ink storage chamber for a liquid ink and may hold all the ink with an absorber. The ink storage portion may have no absorber and may contain all the ink in a liquid state. The ink cartridge may include an ink storage portion and a recording head.

<Ink Jet Recording Method>

In an ink jet recording method according to the present disclosure, an aqueous ink according to the present disclosure described above is ejected from an ink jet recording head to record an image on a recording median. An ink is ejected by applying mechanical enemy to the ink or applying thermal energy to the ink. In the present disclosure, in particular, an ink can be ejected by applying thermal energy to the ink. The ink jet recording method may include known steps, provided that an ink according to the present disclosure is used.

Figure 2A:
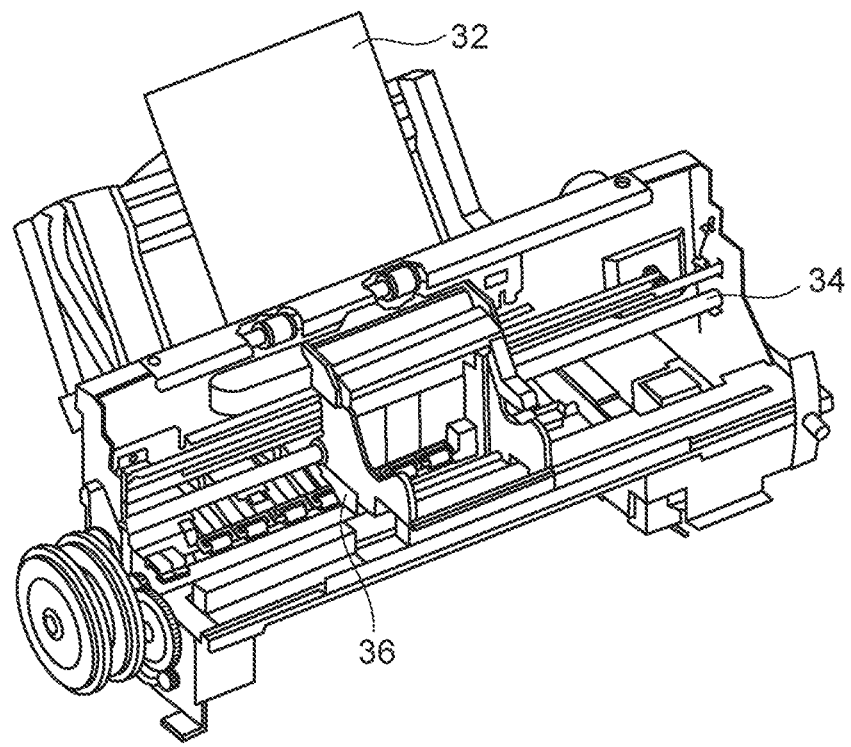
FIG. 2A is a perspective view schematically illustrating an example of a principal part of an ink jet recording apparatus used in an ink jet recording method according to the present disclosure.
Figure 2B:
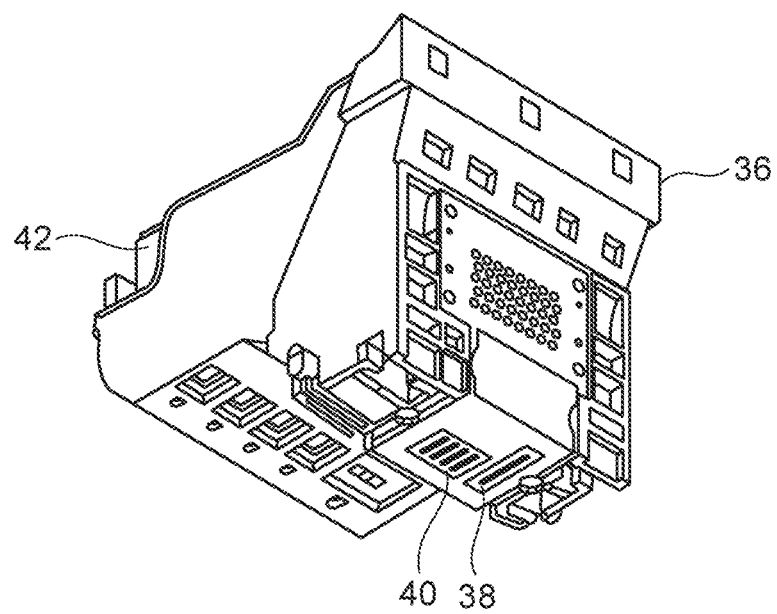
FIG. 2B is a perspective view schematically illustrating an example of a head cartridge used in an ink jet recording method according to the present disclosure.

FIG. 2A is a perspective view schematically illustrating an example of a principal part of an ink jet recording apparatus used in an ink jet recording method according to the present disclosure. FIG. 2B is a perspective view schematically illustrating an example of a head cartridge used in an ink jet recording method according to the present disclosure. The ink jet recording apparatus includes a conveying unit (not shown) for conveying a recording medium 32 and a carriage shaft 34. A head cartridge 36 can be mounted on the carriage shaft 34. The head cartridge 36 includes recording heads 38 and 40 and is configured to be provided with an ink cartridge 42. While the head cartridge 36 is conveyed along the carriage shaft 34 in the main scanning direction, an ink (not shown) is ejected from the recording heads 38 and 40 toward the recording medium 32. The recording medium 32 is conveyed in a sub-scanning direction by the conveying unit (not shown) to record an image on the recording medium 32.

EXAMPLES

Although the present disclosure is described below in more detail in the examples and comparative examples, the present disclosure is not limited to these examples within the gist of the present disclosure. Unless otherwise specified, "part(s)" and "%" with respect to the amount of component are based on mass.

<Analysis of Pigment>

Particle Size, Span Value

The cumulative 50% particle size ($D_{50}$) of a pigment on a volume basis was measured with a particle size analyzer utilizing the dynamic light scattering method (trade name "Nanotrac Wavell-EX150", manufactured by MicrotracBEL Corp.). The measurement conditions were SetZero: 30 seconds, the number of measurements: 3 times, the measurement time: 120 seconds, the shape: non-spherical, the refractive index: 1.51 and the monodisperse mode: ON. The cumulative 50% particle size of a pigment on a volume basis is the diameter of a particle at an integrated value of 50% of the total volume of particles measured from the smallest particle size in a particle size cumulative curve. The cumulative 10% particle size ($D_{10}$) and the cumulative 90% particle size ($D_{90}$) of a pigment on a volume basis in a pigment dispersion liquid were determined with the analyzer, and the span value S was calculated using the formula $S=(D_{90}-D_{10})/D_{50}$.

Crystallite Size

A pigment dispersion liquid was diluted with ion-exchanged water to a pigment content of approximately 1.5% by mass and was ultracentrifuged at 25° C. at 57,000 rpm for 30 minutes to collect the precipitate. The precipitate was dried by standing at 25° C. for one day and was ground using an agate mortar and a pestle to prepare a powder. An XRD spectrum of the powder was measured with a multipurpose X-ray diffractometer (trade name "Empyrean", manufactured by Malvern Panalytical). The measurement conditions were detector: PIXcel3D, emission current: 40 mA, light source: CuKα, divergence slit: fixed, 0.5 degrees, tube voltage: 45 kV, scan male: 5 to 60 degrees and scan step size: 0.04 degrees. The size of a crystallite at a diffraction peak with the highest intensity and at a diffraction peak with the second highest intensity in the spectrum was calculated as a crystallite size using analysis software (trade name "High-Score Plus", manufactured by Malvern Panalytical), and their average value was taken as the crystallite size of the pigment.

Aspect Ratio

1 µL of a pigment dispersion liquid diluted 10,000 times with pure water was dropped onto a surface of a silicon substrate hydrophilized by corona discharge treatment and was dried. A SEM image of 100 pigment particles was taken with a scanning electron microscope. The SEM image was subjected to threshold processing to produce a binary image with a white region representing a background and a black region representing a pigment particle. The major and minor diameters of a pigment particle were measured by approximating the black region representing the pigment particle to an ellipse. The aspect ratio was calculated by averaging the ratios of the major diameter to the minor diameter of 100 pigment particles. Image analysis software ImageJ (developer: Wayne Rasband (NIH)) was used for the threshold processing and the elliptical approximation of the SEM image. An analytical value of the pigment in the form of ink was the same as the analytical value of the pigment in the form of the pigment dispersion liquid.

<Analysis of Resin Dispersant>

Weight-Average Molecular Weight

The weight-average molecular weight (Mw) of a resin used as a resin dispersant was determined as a polystyrene equivalent value measured by gel permeation chromatography (GPC). More specifically, a resin was dissolved in a solvent (tetrahydrofuran) at a temperature of 25° C. for 24 hours. The resulting solution was filtered through a membrane filter to prepare a sample solution. The sample solution was prepared such that the concentration of a component soluble in the solvent was approximately 0.3%. The weight-average molecular weight of the resin was measured using the sample solution under the following conditions.

Apparatus: Molecular weight measuring apparatus (trade name "Acquity Advanced Polymer Chromatography", manufactured by Waters Corporation)
 Column: "Shodex Column GPC KF-806M, 8×300 mm" (trade name, manufactured by Showa Denko K.K.) connected in series (four columns)
 Eluent: tetrahydrofuran
 Flow rate: 1.0 mL/min
 Sample injection volume: 0.100 mL
 Oven temperature: 40° C.

Detector: Refractive index (RI) detector (trade name "Waters 2414 Refractive Index Detector", manufactured by Waters).

The weight-average molecular weight was calculated from a molecular weight calibration curve prepared using standard polystyrene reagents. The reagents used were PS-1 and PS-2 (trade names, manufactured by Polymer Laboratories).

Acid Value

The acid value of a resin used as a resin dispersant was measured by titrimetry according to JIS K-0070. 0.5 to 2.0 g of resin was precisely weighed and used as a sample to be measured. The sample was placed in a 50.0-mL beaker and was dissolved with 25.0 mL of a liquid mixture of tetrahydrofuran and ethanol (volume ratio=2:1), The titration was performed by potentiometric titration using a solution of 0.1 mol/L potassium hydroxide in ethanol as a titrant, and the amount of the titrant used was defined as S (mL). A blank containing no sample was titrated in the same manner, and the amount of the solution of potassium hydroxide in ethanol used was defined as B (mL). An automatic potentiometric titrator (trade name "AT-510", manufactured by Kyoto Electronics Manufacturing Co., Ltd.) was used as the measuring apparatus. The acid value was calculated from S and B using the following formula. f denotes the factor (titer) of the solution of potassium hydroxide in ethanol, and M (g) denotes the precise weight of the sample.

$$\text{Acid value [mg KOH/g]} = (S-B) \times f \times 5.61/M.$$

<Synthesis of Resin Dispersant>

Resin Dispersants 1 to 14

A resin (resin dispersant) was synthesized in the usual manner using monomers listed in Table 1 (unit: parts) and 200.0 parts of propylene glycol monomethyl ether acetate as a solvent. 20.0 parts of the resin was neutralized with potassium hydroxide equimolar to the acid value thereof. An appropriate amount of ion-exchanged water was added to the resin to prepare a liquid containing the resin dispersant at a resin dispersant content of 20.0%.

The abbreviations of the monomers in Table 1 are St: styrene, BzMA: benzyl methacrylate, AA: acrylic acid, MAA: methacrylic acid, nBA: n-butyl acrylate and HEMA: 2-hydroxyethyl methacrylate.

TABLE 1

Synthesis and characteristics of resin dispersants

| Type | Monomer (parts) | | | | | | Weight-average molecular weight | Acid value (mg KOH/g) |
| --- | --- | --- | --- | --- | --- | --- | --- | --- |
| | St | BzMA | nBA | AA | MAA | HEMA | | |
| 1 | 50.0 | | 30.0 | 20.0 | | | 15,000 | 156 |
| 2 | 50.0 | | 30.0 | | 20.0 | | 15,000 | 130 |
| 3 | | 50.0 | 30.0 | 20.0 | | | 15,000 | 156 |
| 4 | 50.0 | | 44.0 | 6.0 | | | 15,000 | 47 |
| 5 | 50.0 | | 43.0 | 7.0 | | | 15,000 | 54 |
| 6 | 50.0 | | 25.0 | 25.0 | | | 15,000 | 195 |
| 7 | 50.0 | | 24.0 | 26.0 | | | 15,000 | 202 |
| 8 | 50.0 | | 30.0 | 20.0 | | | 900 | 156 |
| 9 | 50.0 | | 30.0 | 20.0 | | | 1,000 | 156 |
| 10 | 50.0 | | 30.0 | 20.0 | | | 30,000 | 156 |
| 11 | 50.0 | | 30.0 | 20.0 | | | 31,000 | 156 |
| 12 | 50.0 | | 44.0 | 6.0 | | | 31,000 | 47 |
| 13 | | | 80.0 | 20.0 | | | 15,000 | 156 |
| 14 | 50.0 | | 30.0 | | | 20.0 | 15,000 | 0 |

Resin Dispersant 15

A liquid containing a resin dispersant 15 was prepared in the same manner as in the resin dispersants 1 to 14 except that 50.0 parts of styrene, 30.0 parts of n-butyl acrylate and 200 parts of Blemmer PME 1000 were used. Brenner PME 1000 is a trade name of methoxy poly(ethylene glycol) methacrylate manufactured by NOP Corporation. The resin dispersant 15 had a weight-average molecular weight of 15,000 and an acid value of 0 mg KOH/g.

<Preparation of Pigment Dispersion Liquid>
Pigment Dispersion Liquids 1 to 11, 16 to 39, 44 to 46, 54 to 56

The components shown on the left side of Table 2 were mixed and dispersed in a batch-type vertical sand mill (manufactured by AIMEX Co., Ltd.) filled with zirconia beads under the dispersion conditions shown on the right side of Table 2. The mixture was centrifuged to remove a coarse particle and was pressure-filtered through a microfilter (manufactured by Fujifilm Corporation) with a pore size of 3.0 μm to prepare a pigment dispersion liquid.

TABLE 2

Dispersion conditions of sand mill for pigment dispersion liquid

| | Pigment | | Liquid containing resin dispersant | | Ion-exchanged water (parts) | Dispersion conditions | | |
|---|---|---|---|---|---|---|---|---|
| | | | | | | Loading weight of zirconia beads (parts) | Diameter of zirconia beads (mm) | |
| Type | Type | Used amount (parts) | Type | Used amount (parts) | | | | Time (h) |
| 1 | C.I. Pigment Yellow 101 | 20.0 | 1 | 30.0 | 50.0 | 200 | 0.10 | 5.0 |
| 2 | C.I. Pigment Yellow 101 | 20.0 | 1 | 30.0 | 50.0 | 200 | 0.10 | 1.0 |
| 3 | C.I. Pigment Yellow 101 | 20.0 | 1 | 30.0 | 50.0 | 100 | 0.10 | 5.0 |
| 4 | C.I. Pigment Yellow 101 | 20.0 | 1 | 30.0 | 50.0 | 250 | 0.10 | 5.0 |
| 5 | C.I. Pigment Yellow 101 | 20.0 | 1 | 30.0 | 50.0 | 200 | 0.10 | 7.0 |
| 6 | C.I. Pigment Yellow 101 | 20.0 | 1 | 30.0 | 50.0 | 200 | 0.25 | 5.0 |
| 7 | C.I. Pigment Yellow 101 | 20.0 | 1 | 30.0 | 50.0 | 200 | 0.08 | 5.0 |
| 8 | C.I. Pigment Yellow 101 | 20.0 | 1 | 30.0 | 50.0 | 200 | 0.25 | 3.0 |
| 9 | C.I. Pigment Yellow 101 | 20.0 | 1 | 30.0 | 50.0 | 200 | 0.25 | 2.0 |
| 10 | C.I. Pigment Yellow 101 | 20.0 | 2 | 30.0 | 50.0 | 200 | 0.10 | 5.0 |
| 11 | C.I. Pigment Yellow 101 | 20.0 | 3 | 30.0 | 50.0 | 200 | 0.10 | 5.0 |
| 16 | C.I. Pigment Yellow 101 | 20.0 | 1 | 30.0 | 50.0 | 300 | 0.10 | 5.0 |
| 17 | C.I. Pigment Yellow 101 | 20.0 | 1 | 30.0 | 50.0 | 350 | 0.10 | 5.0 |
| 18 | C.I. Pigment Yellow 101 | 20.0 | 1 | 30.0 | 50.0 | 200 | 0.07 | 5.0 |
| 19 | C.I. Pigment Yellow 101 | 20.0 | 1 | 30.0 | 50.0 | 200 | 0.39 | 5.0 |
| 20 | C.I. Pigment Yellow 101 | 20.0 | 1 | 30.0 | 50.0 | 200 | 0.40 | 5.0 |
| 21 | C.I. Pigment Yellow 101 | 20.0 | 1 | 30.0 | 50.0 | 200 | 0.50 | 5.0 |
| 22 | C.I. Pigment Yellow 101 | 20.0 | 1 | 30.0 | 50.0 | 200 | 0.50 | 15.0 |
| 23 | C.I. Pigment Yellow 101 | 20.0 | 1 | 30.0 | 50.0 | 200 | 0.10 | 15.0 |
| 24 | C.I. Pigment Yellow 101 | 20.0 | 1 | 30.0 | 50.0 | 200 | 0.10 | 10.0 |
| 25 | C.I. Pigment Yellow 101 | 20.0 | 1 | 30.0 | 50.0 | 55 | 0.10 | 5.0 |
| 26 | C.I. Pigment Yellow 101 | 20.0 | 1 | 30.0 | 50.0 | 50 | 0.10 | 5.0 |
| 27 | C.I. Pigment Yellow 101 | 20.0 | 1 | 30.0 | 50.0 | 200 | 0.25 | 1.5 |
| 28 | C.I. Pigment Yellow 101 | 20.0 | 4 | 30.0 | 50.0 | 200 | 0.10 | 5.0 |
| 29 | C.I. Pigment Yellow 101 | 20.0 | 5 | 30.0 | 50.0 | 200 | 0.10 | 5.0 |
| 30 | C.I. Pigment Yellow 101 | 20.0 | 6 | 30.0 | 50.0 | 200 | 0.10 | 5.0 |
| 31 | C.I. Pigment Yellow 101 | 20.0 | 7 | 30.0 | 50.0 | 200 | 0.10 | 5.0 |
| 32 | C.I. Pigment Yellow 101 | 20.0 | 8 | 30.0 | 50.0 | 200 | 0.10 | 5.0 |
| 33 | C.I. Pigment Yellow 101 | 20.0 | 9 | 30.0 | 50.0 | 200 | 0.10 | 5.0 |
| 34 | C.I. Pigment Yellow 101 | 20.0 | 10 | 30.0 | 50.0 | 200 | 0.10 | 5.0 |
| 35 | C.I. Pigment Yellow 101 | 20.0 | 11 | 30.0 | 50.0 | 200 | 0.10 | 5.0 |
| 36 | C.I. Pigment Yellow 101 | 20.0 | 1 | 4.0 | 76.0 | 200 | 0.10 | 5.0 |
| 37 | C.I. Pigment Yellow 101 | 20.0 | 1 | 5.0 | 75.0 | 200 | 0.10 | 5.0 |
| 38 | C.I. Pigment Yellow 101 | 20.0 | 1 | 200.0 | 0.0 | 200 | 0.10 | 5.0 |
| 39 | C.I. Pigment Yellow 101 | 20.0 | 1 | 210.0 | 0.0 | 200 | 0.10 | 5.0 |
| 44 | C.I. Pigment Yellow 101 | 20.0 | 12 | 4.0 | 76.0 | 350 | 0.50 | 5.0 |
| 45 | C.I. Pigment Yellow 74 | 20.0 | 1 | 30.0 | 50.0 | 200 | 0.10 | 5.0 |
| 46 | 9,10-dianilinoanthracene | 20.0 | 1 | 30.0 | 50.0 | 200 | 0.10 | 5.0 |
| 54 | C.I. Pigment Yellow 101 | 20.0 | 13 | 30.0 | 50.0 | 200 | 0.10 | 5.0 |
| 55 | C.I. Pigment Yellow 101 | 20.0 | 14 | 30.0 | 50.0 | 200 | 0.10 | 5.0 |
| 56 | C.I. Pigment Yellow 101 | 20.0 | 15 | 30.0 | 50.0 | 200 | 0.10 | 5.0 |

Pigment Dispersion Liquids 12 to 15, 47, 48

The components shown on the left side of Table 3 were mixed and pre-dispersed (rotational speed: 10,000 rpm) in a dispersion/emulsification machine (trade name "Clearmix", manufactured by M Technique Co., Ltd.) for the time shown in Table 3. The mixture was then dispersed in a high-pressure homogenizer (trade name "Star Burst", manufactured by Sugino Machine Ltd.) under the dispersion conditions shown on the right side of Table 3. The mixture was centrifuged to remove a coarse particle and was pressure-filtered through a microfilter (manufactured by Fujifilm Corporation) with a pore size of 3.0 μm to prepare a pigment dispersion liquid.

TABLE 3

Dispersion conditions of Clearmix and high-pressure homogenizer for pigment dispersion liquid

| | Pigment | | Liquid containing resin dispersant | | Ion- | Dispersion conditions | | |
|---|---|---|---|---|---|---|---|---|
| Type | Type | Used amount (parts) | Type | Used amount (parts) | exchanged water (parts) | Pre-dispersion Time (min) | Process pressure (MPa) | Number of processing passes |
| 12 | C.I. Pigment Yellow 101 | 20.0 | 1 | 30.0 | 50.0 | 60.0 | 230 | 90 |
| 13 | C.I. Pigment Yellow 101 | 20.0 | 1 | 30.0 | 50.0 | 5.0 | 230 | 90 |
| 14 | C.I. Pigment Yellow 101 | 20.0 | 1 | 30.0 | 50.0 | 5.0 | 230 | 10 |
| 15 | C.I. Pigment Yellow 101 | 20.0 | 1 | 30.0 | 50.0 | 5.0 | 170 | 10 |
| 47 | C.I. Pigment Yellow 74 | 20.0 | 1 | 30.0 | 50.0 | 60.0 | 230 | 90 |
| 48 | 9,10-dianilinoanthracene | 20.0 | 1 | 30.0 | 50.0 | 60.0 | 230 | 90 |

Pigment Dispersion Liquids 40, 41, 49, and 50

The components shown on the left side of Table 4 were mixed and dispersed in an ultrasonic homogenizer (trade name "UH-300", manufactured by SMT Co., Ltd.) aider the dispersion conditions shown in Table 4. The mixture was centrifuged to remove a coarse particle and was pressure-filtered through a microfilter (manufactured by Fujifilm Corporation) with a pore size of 3.0 μm to prepare a pigment dispersion liquid.

TABLE 4

Dispersion conditions of ultrasonic homogenizer for pigment dispersion liquid

| | Pigment | | Liquid containing resin dispersant | | Ion- | Dispersion conditions | |
|---|---|---|---|---|---|---|---|
| Type | Type | Used amount (parts) | Type | Used amount (parts) | exchanged water (parts) | Output (W) | Time (h) |
| 40 | C.I. Pigment Yellow 101 | 20.0 | 1 | 30.0 | 50.0 | 150 | 1.0 |
| 41 | C.I. Pigment Yellow 101 | 20.0 | 1 | 30.0 | 50.0 | 300 | 15.0 |
| 49 | C.I. Pigment Yellow 74 | 20.0 | 1 | 30.0 | 50.0 | 150 | 1.0 |
| 50 | 9,10-dianilinoanthracene | 20.0 | 1 | 30.0 | 50.0 | 150 | 1.0 |

Pigment Dispersion Liquids 42, 43, 51, and 52

The components shown on the left side of Table 5 were mixed and dispersed using a paint shaker under the conditions shown in Table 5. The mixture was centrifuged to remove a coarse particle and was pressure-filtered through a microfilter (manufactured by Fujifilm Corporation) with a pore size of 3.0 μm to prepare a pigment dispersion liquid.

TABLE 5

Dispersion conditions of paint shaker for pigment dispersion liquid

| Pigment | | Liquid containing resin dispersant | | Ion-exchanged water (parts) | Dispersion conditions | | |
|---|---|---|---|---|---|---|---|
| Type | Type | Used amount (parts) | Type | Used amount (parts) | Loading weight of zirconia beads (parts) | Diameter of zirconia beads (mm) | Time (h) |
| 42 | C.I. Pigment Yellow 101 | 20.0 | 1 | 30.0 | 50.0 | 200 | 0.10 | 8.0 |
| 43 | C.I. Pigment Yellow 101 | 20.0 | 1 | 30.0 | 50.0 | 200 | 0.10 | 15.0 |
| 51 | C.I. Pigment Yellow 74 | 20.0 | 1 | 30.0 | 50.0 | 200 | 0.10 | 8.0 |
| 52 | 9,10-dianilinoanthracene | 20.0 | 1 | 30.0 | 50.0 | 200 | 0.10 | 8.0 |

Pigment Dispersion Liquid 53

45.0 parts of the pigment (C.I. Pigment Yellow 101) and 12.0 parts of sulfanilic acid were mixed in a flask. The flask was placed in a water bath at 70° C. and was charged while stirring with aqueous potassium nitrite prepared by dissolving 6.3 parts of potassium nitrite in 223.1 parts of ion-exchanged water, thereby preparing a slurry. The pH of the slurry was adjusted to 2.0 with hydrochloric acid, and the slurry was stirred at 70° C. for one hour. The slurry was dried to prepare a dispersion liquid containing a self-dispersible pigment with a —$C_6H_4$—$SO_3K$ group bonded to its surface. 450 parts of the dispersion liquid was diluted with ion-exchanged water to 2,250 parts and was concentrated by ultrafiltration to 450 parts. The dilution and concentration were repeated to purify the pigment dispersion liquid until the filtrate had an electrical conductivity of 50 μS/cm or less. The pigment dispersion liquid was finally concentrated to 300 parts. An ultrafiltration membrane (trade name "OS300C11", molecular weight cut-off: 300K, manufactured by Nihon Pall Ltd.) was used for the ultrafiltration. The pigment dispersion liquid was then centrifuged with a centrifugal separator (trade name "CR-21G", manufactured by Hitachi Koki Co., Ltd.) at 5000 rpm for 15 minutes to remove a coarse particle, and 4 mol/L aqueous potassium hydroxide was then added to the pigment dispersion liquid to adjust the pH to 11.0. An appropriate amount of ion-exchanged water was added to the pigment dispersion liquid to prepare a pigment dispersion liquid 53 with a pigment content of 20.0%.

Pigment Dispersion Liquid 57

10.0 parts of the pigment (C.I. Pigment Yellow 101), 60.0 parts of dimethyl sulfoxide and 30.0 parts of 25.0% aqueous tetramethylammonium hydroxide were mixed in a flask to prepare a liquid in which the pigment was dissolved. Aqueous citric acid prepared by mixing 70.0 parts of ion-exchanged water and 25.0 parts of citric acid was added dropwise with vigorous stirring to the liquid at a constant rate for two hours to prepare a pigment suspension. The suspension was filtered under reduced pressure to prepare a wet cake of the pigment. The wet cake of the pigment was added to 5,000 parts of ion-exchanged water, was stirred with the dispersion/emulsification machine (trade name "Clearmix", manufactured by M Technique Co., Ltd.) at a rotational speed of 6,000 rpm for 1.5 minutes and was then filtered under reduced pressure to collect the wet cake of the pigment. The operations of stirring and filtration were repeated four times to wash the pigment and prepare a wet cake of the pigment. The wet cake of the pigment was dried under reduced pressure to prepare a pigment powder. 20.0 parts of the pigment powder, 30.0 parts of a liquid containing the resin dispersant 1 and 50.0 parts of ion-exchanged water were mixed and dispersed for 5.0 hours in a batch-type vertical sand mill (manufactured by AMEX Co., Ltd.) filled with 200 parts of zirconia beads with a diameter of 0.10 mm. The mixture was centrifuged to remove a coarse particle and was pressure-filtered through a microfilter (manufactured by Fujifilm Corporation) with a pore size of 3.0 μm to prepare a pigment dispersion liquid 57 with a pigment content of 20.0% and a resin (resin dispersant) content of 6.0%.

Pigment Dispersion Liquid 58

A pigment dispersion liquid 58 with a pigment content of 20.0% and a resin (resin dispersant) content of 6.0% was prepared in the same manner as the pigment dispersion liquid 57 except that the amount of the pigment used was 5.0 parts and the amount of dimethyl sulfoxide used was 65.0 parts.

Pigment Dispersion Liquid 59

20.0 parts of a yellow plastic fluorescent pigment (trade name "FZ-5005", manufactured by Sinloihi Co., Ltd.), 30.0 parts of a liquid containing the resin dispersant 1 and 50.0 parts of ion-exchanged water were mixed and dispersed for 5.0 hours in a batch-type vertical sand mill (manufactured by AMEX Co., Ltd.) filled with 200 parts of zirconia beads with a diameter of 0.10 mm. The mixture was centrifuged to remove a coarse particle and was pressure-filtered through a microfilter (manufactured by Fujifilm Corporation) with a pore size of 3.0 μm to prepare a pigment dispersion liquid 59 with a pigment content of 20.0% and a resin (resin dispersant) content of 6.0%.

The physical properties of the pigment dispersion liquids thus prepared are summarized in Table 6.

TABLE 6

Physical properties of pigment dispersion liquid

| Type | Pigment crystallite size (nm) | Pigment aspect ratio (times) | Pigment span value (times) | Pigment average particle size (nm) | Pigment content P(%) | Resin dispersant content B (%) | B/P (times) |
|---|---|---|---|---|---|---|---|
| 1 | 40 | 1.3 | 1.5 | 100 | 20.0 | 6.0 | 0.30 |
| 2 | 40 | 2.0 | 2.6 | 200 | 20.0 | 6.0 | 0.30 |
| 3 | 40 | 1.8 | 2.3 | 100 | 20.0 | 6.0 | 0.30 |
| 4 | 35 | 1.3 | 1.5 | 80 | 20.0 | 6.0 | 0.30 |
| 5 | 40 | 1.3 | 1.3 | 90 | 20.0 | 6.0 | 0.30 |
| 6 | 40 | 1.8 | 2.0 | 120 | 20.0 | 6.0 | 0.30 |
| 7 | 40 | 1.2 | 1.5 | 90 | 20.0 | 6.0 | 0.30 |
| 8 | 40 | 2.0 | 2.2 | 150 | 20.0 | 6.0 | 0.30 |
| 9 | 40 | 2.2 | 3.0 | 180 | 20.0 | 6.0 | 0.30 |
| 10 | 40 | 1.3 | 1.5 | 100 | 20.0 | 6.0 | 0.30 |
| 11 | 40 | 1.3 | 1.5 | 100 | 20.0 | 6.0 | 0.30 |
| 12 | 40 | 1.4 | 2.0 | 100 | 20.0 | 6.0 | 0.30 |
| 13 | 40 | 1.4 | 2.1 | 110 | 20.0 | 6.0 | 0.30 |
| 14 | 40 | 1.4 | 2.1 | 120 | 20.0 | 6.0 | 0.30 |
| 15 | 40 | 1.5 | 2.3 | 130 | 20.0 | 6.0 | 0.30 |
| 16 | 30 | 1.3 | 1.5 | 75 | 20.0 | 6.0 | 0.30 |
| 17 | 28 | 1.3 | 1.5 | 60 | 20.0 | 6.0 | 0.30 |
| 18 | 40 | 1.1 | 1.5 | 80 | 20.0 | 6.0 | 0.30 |
| 19 | 40 | 3.0 | 2.3 | 130 | 20.0 | 6.0 | 0.30 |
| 20 | 40 | 3.1 | 2.6 | 170 | 20.0 | 6.0 | 0.30 |
| 21 | 40 | 3.7 | 3.4 | 200 | 20.0 | 6.0 | 0.30 |
| 22 | 40 | 3.7 | 3.1 | 60 | 20.0 | 6.0 | 0.30 |
| 23 | 40 | 1.3 | 0.9 | 50 | 20.0 | 6.0 | 0.30 |
| 24 | 40 | 1.3 | 1.0 | 80 | 20.0 | 6.0 | 0.30 |
| 25 | 40 | 2.1 | 3.0 | 100 | 20.0 | 6.0 | 0.30 |
| 26 | 40 | 2.4 | 3.1 | 100 | 20.0 | 6.0 | 0.30 |
| 27 | 40 | 2.4 | 3.1 | 200 | 20.0 | 6.0 | 0.30 |
| 28 | 40 | 1.3 | 1.5 | 100 | 20.0 | 6.0 | 0.30 |
| 29 | 40 | 1.3 | 1.5 | 100 | 20.0 | 6.0 | 0.30 |
| 30 | 40 | 1.3 | 1.5 | 100 | 20.0 | 6.0 | 0.30 |
| 31 | 40 | 1.3 | 1.5 | 100 | 20.0 | 6.0 | 0.30 |
| 32 | 40 | 1.3 | 1.5 | 100 | 20.0 | 6.0 | 0.30 |
| 33 | 40 | 1.3 | 1.5 | 100 | 20.0 | 6.0 | 0.30 |
| 34 | 40 | 1.3 | 1.5 | 100 | 20.0 | 6.0 | 0.30 |
| 35 | 40 | 1.3 | 1.5 | 100 | 20.0 | 6.0 | 0.30 |
| 36 | 40 | 1.3 | 1.5 | 100 | 20.0 | 0.8 | 0.04 |
| 37 | 40 | 1.3 | 1.5 | 100 | 20.0 | 1.0 | 0.05 |
| 38 | 40 | 1.3 | 1.5 | 100 | 20.0 | 40.0 | 2.00 |
| 39 | 40 | 1.3 | 1.5 | 100 | 20.0 | 42.0 | 2.10 |
| 40 | 40 | 3.5 | 3.5 | 250 | 20.0 | 6.0 | 0.30 |
| 41 | 40 | 3.2 | 3.2 | 150 | 20.0 | 6.0 | 0.30 |
| 42 | 40 | 3.4 | 3.3 | 250 | 20.0 | 6.0 | 0.30 |
| 43 | 40 | 3.2 | 3.2 | 150 | 20.0 | 6.0 | 0.30 |
| 44 | 28 | 3.7 | 3.4 | 170 | 20.0 | 0.8 | 0.04 |
| 45 | 25 | 1.6 | 1.5 | 100 | 20.0 | 6.0 | 0.30 |
| 46 | 28 | 1.8 | 2.0 | 120 | 20.0 | 6.0 | 0.30 |
| 47 | 25 | 1.7 | 2.0 | 100 | 20.0 | 6.0 | 0.30 |
| 48 | 28 | 1.9 | 2.4 | 120 | 20.0 | 6.0 | 0.30 |
| 49 | 25 | 2.2 | 2.3 | 130 | 20.0 | 6.0 | 0.30 |
| 50 | 28 | 2.5 | 2.6 | 150 | 20.0 | 6.0 | 0.30 |
| 51 | 25 | 2.1 | 2.2 | 130 | 20.0 | 6.0 | 0.30 |
| 52 | 28 | 2.5 | 2.5 | 150 | 20.0 | 6.0 | 0.30 |
| 53 | 40 | 1.3 | 1.5 | 100 | 20.0 | 0.0 | 0.00 |
| 54 | 40 | 1.3 | 1.5 | 100 | 20.0 | 6.0 | 0.30 |
| 55 | 40 | 1.3 | 1.5 | 100 | 20.0 | 6.0 | 0.30 |
| 56 | 40 | 1.3 | 1.5 | 100 | 20.0 | 6.0 | 0.30 |
| 57 | 100 | 1.3 | 1.5 | 150 | 20.0 | 6.0 | 0.30 |
| 58 | 110 | 1.3 | 1.5 | 150 | 20.0 | 6.0 | 0.30 |
| 59 | — | — | 4.0 | 1,000 | 20.0 | 6.0 | 0.30 |

<Preparation of Ink>

The components shown in the upper rows of Tables 7 to 10 (unit: %, the unit for 2-naphthol and 2-hydroxy-1-naphthaldehyde is ppm) were mixed, sufficiently stirred and then pressure-filtered through a microfilter (manufactured by Fujifilm Corporation) with a pore size of 3.0 μm to prepare inks. Ion-exchanged water was added in such a quantity that the sum of the components was 100.0%.

The lower rows of Tables 7 to 10 show the characteristics of the inks. In Tables 7 to 10, the amount (ppm) of compound represented by the general formula (3) based on the pigment is calculated using the formula 1,000,000×A/P (the unit for A and P is %). For example, in an ink according to Example 1, (%) is 001% (100 ppm) and P (%) is 5.0%, so that the amount (ppm) of compound represented by the general formula (3) based on the pigment in Table 7 is "2,000". In the table, "Acetylenol E100" and "Acetylenol E60" are trade names of nonionic surfactants manufactured by Kawaken Fine Chemicals Co., Ltd. and are compounds represented by the general formula (1). The value given to poly(ethylene glycol)(PEG) is the number-average molecular weight of the polyethylene glycol).

Comparative Example 13

An ink according to Comparative Example 13 was prepared in accordance with the description of "Synthesis Example 4" of Japanese Patent Laid-Open No. 2003-026964. More specifically, 50.0 parts of C.I. Pigment Yellow 101, 10.0 parts of poly(vinyl butyral) and 150.0 parts of ethyl acetate were mixed and dispersed using a sand grinder filled with 50% by volume of 0.5-nm zirconia beads and were centrifuged to prepare a dispersion liquid. 12.5 parts of the dispersion liquid, 4.0 parts of poly(vinyl butyral) and 36.0 parts of ethyl acetate in a flask equipped with a stirrer and a nitrogen reflux unit were stirred in a nitrogen environment. 90.0 parts of an aqueous solution containing 1.9 parts of sodium lauryl sulfate was added dropwise to the mixture. The mixture was stirred and subjected to ultrasonication for 300 seconds in an ultrasonic homogenizer (trade name "UH-150", manufactured by SMT Co., Ltd.) to emulsify the components. The ethyl acetate was then removed under reduced pressure. 1.5 parts of potassium persulfate was dissolved in the resulting compound. The compound was heated to 80° C. and was reacted for 7 hours while dropping a liquid mixture of 1.5 parts of styrene and 1.5 parts of 2-hydroxyethyl methacrylate. 20.0 parts of ethylene glycol and an appropriate amount of ion-exchanged water were added to the resulting dispersion liquid to prepare an ink with a pigment content of 2.5%. The B/P ratio was 3.10 times.

Comparative Example 14

An ink according to Comparative Example 14 containing a resin particle 10 and a water-soluble resin 1 described later was prepared in accordance with the description of "Example 10" of Japanese Patent Laid-Open No. 2021-8598. The resin particle is a core-shell resin particle and is dyed with a basic dye (two fluorescent dyes) with a coumarin skeleton. The two fluorescent dyes are C.I. Disperse Yellow 82 and C.I. Solvent Yellow 160:1 (80:20 (mass ratio)). The core is composed of units derived from styrene and acrylonitrile. The shell is composed of units derived from styrene, methacrylic acid, ethylene glycol dimethacrylate and ethylene glycol diglycidyl ether (trade name "Denacol EX-810", manufactured by Nagase ChemteX Corporation). The water-soluble resin is composed of units derived from styrene, n-butyl acrylate and methacrylic acid.

TABLE 7

Preparation and characteristics of ink

| | Example | | | | | | | |
|---|---|---|---|---|---|---|---|---|
| | 1 | 2 | 3 | 4 | 5 | 6 | 7 | 8 |
| Type of pigment dispersion liquid | 1 | 1 | 1 | 2 | 3 | 4 | 5 | 6 |
| Pigment dispersion liquid | 25.0 | 2.5 | 75.0 | 25.0 | 25.0 | 25.0 | 25.0 | 25.0 |
| C.I. Basic Yellow 40 | | | | | | | | |
| Acetylenol E100 | 0.3 | 0.3 | 0.3 | 0.3 | 0.3 | 0.3 | 0.3 | 0.3 |
| Acetylenol E60 | | | | | | | | |
| Triethylene glycol | 5.0 | 5.0 | 5.0 | 5.0 | 5.0 | 5.0 | 5.0 | 5.0 |
| Diethylene glycol | | | | | | | | |
| PEG600 | | | | | | | | |
| PEG1000 | | | | | | | | |
| Propylene glycol | | | | | | | | |
| 1,2-hexanediol | | | | | | | | |
| 1,6-hexanediol | | | | | | | | |
| Ethylene glycol | | | | | | | | |
| 2-naphthol(ppm) | 50 | 5 | 150 | 50 | 50 | 50 | 50 | 50 |
| 2-hydroxy-1-naphthaldehyde(ppm) | 50 | 5 | 150 | 50 | 50 | 50 | 50 | 50 |
| Glycerin | 10.0 | 10.0 | 10.0 | 10.0 | 10.0 | 10.0 | 10.0 | 10.0 |
| Ion-exchanged water | 59.7 | 82.2 | 9.7 | 59.7 | 59.7 | 59.7 | 59.7 | 59.7 |
| Amount A of compound represented by general formula (3) (ppm) | 100 | 10 | 300 | 100 | 100 | 100 | 100 | 100 |
| Pigment content P (%) | 5.0 | 0.5 | 15.0 | 5.0 | 5.0 | 5.0 | 5.0 | 5.0 |
| Resin dispersant content B (%) | 1.5 | 0.15 | 4.5 | 1.5 | 1.5 | 1.5 | 1.5 | 1.5 |
| B/P (times) | 0.30 | 0.30 | 0.30 | 0.30 | 0.30 | 0.30 | 0.30 | 0.30 |
| Amount (ppm) of compound represented by general formula (3) based on pigment | 2,000 | 2,000 | 2,000 | 2,000 | 2,000 | 2,000 | 2,000 | 2,000 |

| | Example | | | | | | |
|---|---|---|---|---|---|---|---|
| | 9 | 10 | 11 | 12 | 13 | 14 | 15 |
| Type of pigment dispersion liquid | 7 | 8 | 9 | 10 | 11 | 1 | 1 |
| Pigment dispersion liquid | 25.0 | 25.0 | 25.0 | 25.0 | 25.0 | 25.0 | 25.0 |
| C.I. Basic Yellow 40 | | | | | | | |
| Acetylenol E100 | 0.3 | 0.3 | 0.3 | 0.3 | 0.3 | 0.01 | 5.0 |
| Acetylenol E60 | | | | | | | |

TABLE 7-continued

Preparation and characteristics of ink

| | | | | | | | |
|---|---|---|---|---|---|---|---|
| Triethylene glycol | 5.0 | 5.0 | 5.0 | 5.0 | 5.0 | 5.0 | 5.0 |
| Diethylene glycol | | | | | | | |
| PEG600 | | | | | | | |
| PEG1000 | | | | | | | |
| Propylene glycol | | | | | | | |
| 1,2-hexanediol | | | | | | | |
| 1,6-hexanediol | | | | | | | |
| Ethylene glycol | | | | | | | |
| 2-naphthol(ppm) | 50 | 50 | 50 | 50 | 50 | 50 | 50 |
| 2-hydroxy-1-naphthaldehyde(ppm) | 50 | 50 | 50 | 50 | 50 | 50 | 50 |
| Glycerin | 10.0 | 10.0 | 10.0 | 10.0 | 10.0 | 10.0 | 10.0 |
| Ion-exchanged water | 59.7 | 59.7 | 59.7 | 59.7 | 59.7 | 60.0 | 55.0 |
| Amount A of compound represented by general formula (3) (ppm) | 100 | 100 | 100 | 100 | 100 | 100 | 100 |
| Pigment content P (%) | 5.0 | 5.0 | 5.0 | 5.0 | 5.0 | 5.0 | 5.0 |
| Resin dispersant content B (%) | 1.5 | 1.5 | 1.5 | 1.5 | 1.5 | 1.5 | 1.5 |
| B/P (times) | 0.30 | 0.30 | 0.30 | 0.30 | 0.30 | 0.30 | 0.30 |
| Amount (ppm) of compound represented by general formula (3) based on pigment | 2,000 | 2,000 | 2,000 | 2,000 | 2,000 | 2,000 | 2,000 |

| | Example | | | | | |
|---|---|---|---|---|---|---|
| | 16 | 17 | 18 | 19 | 20 | 21 |
| Type of pigment dispersion liquid | 1 | 1 | 1 | 1 | 1 | 1 |
| Pigment dispersion liquid C.I. Basic Yellow 40 | 25.0 | 25.0 | 25.0 | 25.0 | 25.0 | 25.0 |
| Acetylenol E100 | | 0.3 | 0.3 | 0.3 | 0.3 | 0.3 |
| Acetylenol E60 | 0.3 | | | | | |
| Triethylene glycol | 5.0 | 0.1 | 15.0 | | | |
| Diethylene glycol | | | | 5.0 | | |
| PEG600 | | | | | 5.0 | |
| PEG1000 | | | | | | 5.0 |
| Propylene glycol | | | | | | |
| 1,2-hexanediol | | | | | | |
| 1,6-hexanediol | | | | | | |
| Ethylene glycol | | | | | | |
| 2-naphthol(ppm) | 50 | 50 | 50 | 50 | 50 | 50 |
| 2-hydroxy-1-naphthaldehyde(ppm) | 50 | 50 | 50 | 50 | 50 | 50 |
| Glycerin | 10.0 | 10.0 | 10.0 | 10.0 | 10.0 | 10.0 |
| Ion-exchanged water | 59.7 | 64.6 | 49.7 | 59.7 | 59.7 | 59.7 |
| Amount A of compound represented by general formula (3) (ppm) | 100 | 100 | 100 | 100 | 100 | 100 |
| Pigment content P (%) | 5.0 | 5.0 | 5.0 | 5.0 | 5.0 | 5.0 |
| Resin dispersant content B (%) | 1.5 | 1.5 | 1.5 | 1.5 | 1.5 | 1.5 |
| B/P (times) | 0.30 | 0.30 | 0.30 | 0.30 | 0.30 | 0.30 |
| Amount (ppm) of compound represented by general formula (3) based on pigment | 2,000 | 2,000 | 2,000 | 2,000 | 2,000 | 2,000 |

TABLE 8

Preparation and characteristics of ink

| | Example | | | | | | | |
|---|---|---|---|---|---|---|---|---|
| | 22 | 23 | 24 | 25 | 26 | 27 | 28 | 29 |
| Type of pigment dispersion liquid | 1 | 1 | 1 | 1 | 1 | 1 | 1 | 12 |
| Pigment dispersion liquid C.I. Basic Yellow 40 | 25.0 | 25.0 | 25.0 | 25.0 | 25.0 | 25.0 | 25.0 | 25.0 |
| Acetylenol E100 | 0.3 | 0.3 | 0.3 | 0.3 | | 0.3 | 0.3 | 0.3 |
| Acetylenol E60 | | | | | | | | |

TABLE 8-continued

| Preparation and characteristics of ink | | | | | | | | |
|---|---|---|---|---|---|---|---|---|
| Triethylene glycol | | | | | 5.0 | 5.0 | 5.0 | 5.0 |
| Diethylene glycol | | | | | | | | |
| PEG600 | | | | | | | | |
| PEG1000 | | | | | | | | |
| Propylene glycol | 5.0 | | | | | | | |
| 1.2-hexanediol | | 5.0 | | | | | | |
| 1,6-hexanediol | | | 5.0 | | | | | |
| Ethylene glycol | | | | | | | | |
| 2-naphthol(ppm) | 50 | 50 | 50 | 50 | 50 | 100 | | 50 |
| 2-hydroxy-1-naphthaldehyde(ppm) | 50 | 50 | 50 | 50 | 50 | | 100 | 50 |
| Glycerin | 10.0 | 10.0 | 10.0 | 10.0 | 10.0 | 10.0 | 10.0 | 10.0 |
| Ion-exchanged water | 59.7 | 59.7 | 59.7 | 64.7 | 60.0 | 59.7 | 59.7 | 59.7 |
| Amount A of compound represented by general formula (3) (ppm) | 100 | 100 | 100 | 100 | 100 | 100 | 100 | 100 |
| Pigment content P (%) | 5.0 | 5.0 | 5.0 | 5.0 | 5.0 | 5.0 | 5.0 | 5.0 |
| Resin dispersant content B (%) | 1.5 | 1.5 | 1.5 | 1.5 | 1.5 | 1.5 | 1.5 | 1.5 |
| B/P (times) | 0.30 | 0.30 | 0.30 | 0.30 | 0.30 | 0.30 | 0.30 | 0.30 |
| Amount (ppm) of compound represented by general formula (3) based on pigment | 2,000 | 2,000 | 2,000 | 2,000 | 2,000 | 2,000 | 2,000 | 2,000 |

| | Example | | | | | | |
|---|---|---|---|---|---|---|---|
| | 30 | 31 | 32 | 33 | 34 | 35 | 36 |
| Type of pigment dispersion liquid | 13 | 14 | 15 | 16 | 17 | 57 | 58 |
| Pigment dispersion liquid | 25.0 | 25.0 | 25.0 | 25.0 | 25.0 | 25.0 | 25.0 |
| C.I. Basic Yellow 40 | | | | | | | |
| Acetylenol E100 | 0.3 | 0.3 | 0.3 | 0.3 | 0.3 | 0.3 | 0.3 |
| Acetylenol E60 | | | | | | | |
| Triethylene glycol | 5.0 | 5.0 | 5.0 | 5.0 | 5.0 | 5.0 | 5.0 |
| Diethylene glycol | | | | | | | |
| PEG600 | | | | | | | |
| PEG1000 | | | | | | | |
| Propylene glycol | | | | | | | |
| 1.2-hexanediol | | | | | | | |
| 1,6-hexanediol | | | | | | | |
| Ethylene glycol | | | | | | | |
| 2-naphthol(ppm) | 50 | 50 | 50 | 50 | 50 | 50 | 50 |
| 2-hydroxy-1-naphthaldehyde(ppm) | 50 | 50 | 50 | 50 | 50 | 50 | 50 |
| Glycerin | 10.0 | 10.0 | 10.0 | 10.0 | 10.0 | 10.0 | 10.0 |
| Ion-exchanged water | 59.7 | 59.7 | 59.7 | 59.7 | 59.7 | 59.7 | 59.7 |
| Amount A of compound represented by general formula (3) (ppm) | 100 | 100 | 100 | 100 | 100 | 100 | 100 |
| Pigment content P (%) | 5.0 | 5.0 | 5.0 | 5.0 | 5.0 | 5.0 | 5.0 |
| Resin dispersant content B (%) | 1.5 | 1.5 | 1.5 | 1.5 | 1.5 | 1.5 | 1.5 |
| B/P (times) | 0.30 | 0.30 | 0.30 | 0.30 | 0.30 | 0.30 | 0.30 |
| Amount (ppm) of compound represented by general formula (3) based on pigment | 2,000 | 2,000 | 2,000 | 2,000 | 2,000 | 2,000 | 2,000 |

| | Example | | | | | |
|---|---|---|---|---|---|---|
| | 37 | 38 | 39 | 40 | 41 | 42 |
| Type of pigment dispersion liquid | 18 | 19 | 20 | 21 | 22 | 23 |
| Pigment dispersion liquid | 25.0 | 25.0 | 25.0 | 25.0 | 25.0 | 25.0 |
| C.I. Basic Yellow 40 | | | | | | |
| Acetylenol E100 | 0.3 | 0.3 | 0.3 | 0.3 | 0.3 | 0.3 |
| Acetylenol E60 | | | | | | |
| Triethylene glycol | 5.0 | 5.0 | 5.0 | 5.0 | 5.0 | 5.0 |
| Diethylene glycol | | | | | | |
| PEG600 | | | | | | |
| PEG1000 | | | | | | |
| Propylene glycol | | | | | | |
| 1.2-hexanediol | | | | | | |
| 1,6-hexanediol | | | | | | |
| Ethylene glycol | | | | | | |

TABLE 8-continued

| Preparation and characteristics of ink | | | | | | |
|---|---|---|---|---|---|---|
| 2-naphthol(ppm) | 50 | 50 | 50 | 50 | 50 | 50 |
| 2-hydroxy-1-naphthaldehyde(ppm) | 50 | 50 | 50 | 50 | 50 | 50 |
| Glycerin | 10.0 | 10.0 | 10.0 | 10.0 | 10.0 | 10.0 |
| Ion-exchanged water | 59.7 | 59.7 | 59.7 | 59.7 | 59.7 | 59.7 |
| Amount A of compound represented by general formula (3) (ppm) | 100 | 100 | 100 | 100 | 100 | 100 |
| Pigment content P (%) | 5.0 | 5.0 | 5.0 | 5.0 | 5.0 | 5.0 |
| Resin dispersant content B (%) | 1.5 | 1.5 | 1.5 | 1.5 | 1.5 | 1.5 |
| B/P (times) | 0.30 | 0.30 | 0.30 | 0.30 | 0.30 | 0.30 |
| Amount (ppm) of compound represented by general formula (3) based on pigment | 2,000 | 2,000 | 2,000 | 2,000 | 2,000 | 2,000 |

TABLE 9

Preparation and characteristics of ink

| | Example | | | | | | | | | |
|---|---|---|---|---|---|---|---|---|---|---|
| | 43 | 44 | 45 | 46 | 47 | 48 | 49 | 50 | 51 | 52 |
| Type of pigment dispersion liquid | 24 | 25 | 26 | 27 | 40 | 41 | 42 | 43 | 1 | 1 |
| Pigment dispersion liquid C.I. Basic Yellow 40 | 25.0 | 25.0 | 25.0 | 25.0 | 25.0 | 25.0 | 25.0 | 25.0 | 25.0 | 25.0 |
| Acetylenol E100 | 0.3 | 0.3 | 0.3 | 0.3 | 0.3 | 0.3 | 0.3 | 0.3 | | |
| Acetylenol E60 | | | | | | | | | | |
| Triethylene glycol | 5.0 | 5.0 | 5.0 | 5.0 | 5.0 | 5.0 | 5.0 | 5.0 | | |
| Diethylene glycol | | | | | | | | | | |
| PEG600 | | | | | | | | | | |
| PEG1000 | | | | | | | | | | |
| Propylene glycol | | | | | | | | | | |
| 1,2-hexanediol | | | | | | | | | | |
| 1,6-hexanediol | | | | | | | | | | |
| Ethylene glycol | | | | | | | | | | 5.0 |
| 2-naphthol(ppm) | 50 | 50 | 50 | 50 | 50 | 50 | 50 | 50 | 50 | 50 |
| 2-hydroxy-1-naphthaldehyde(ppm) | 50 | 50 | 50 | 50 | 50 | 50 | 50 | 50 | 50 | 50 |
| Glycerin | 10.0 | 10.0 | 10.0 | 10.0 | 10.0 | 10.0 | 10.0 | 10.0 | 10.0 | 10.0 |
| Ion-exchanged water | 59.7 | 59.7 | 59.7 | 59.7 | 59.7 | 59.7 | 59.7 | 59.7 | 65.0 | 60.0 |
| Amount A of compound represented by general formula (3) (ppm) | 100 | 100 | 100 | 100 | 100 | 100 | 100 | 100 | 100 | 100 |
| Pigment content P (%) | 5.0 | 5.0 | 5.0 | 5.0 | 5.0 | 5.0 | 5.0 | 5.0 | 5.0 | 5.0 |
| Resin dispersant content B (%) | 1.5 | 1.5 | 1.5 | 1.5 | 1.5 | 1.5 | 1.5 | 1.5 | 1.5 | 1.5 |
| B/P (times) | 0.30 | 0.30 | 0.30 | 0.30 | 0.30 | 0.30 | 0.30 | 0.30 | 0.30 | 0.30 |
| Amount (ppm) of compound represented by general formula (3) based on pigment | 2,000 | 2,000 | 2,000 | 2,000 | 2,000 | 2,000 | 2,000 | 2,000 | 2,000 | 2,000 |

| | Example | | | | | | | | | | |
|---|---|---|---|---|---|---|---|---|---|---|---|
| | 53 | 54 | 55 | 56 | 57 | 58 | 59 | 60 | 61 | 62 | 63 |
| Type of pigment dispersion liquid | 1 | 1 | 1 | 1 | 1 | 28 | 29 | 30 | 31 | 32 | 33 |
| Pigment dispersion liquid C.I. Basic Yellow 40 | 25.0 | 75.0 | 75.0 | 25.0 | 25.0 | 25.0 | 25.0 | 25.0 | 25.0 | 25.0 | 25.0 |
| Acetylenol E100 | 0.3 | 0.3 | 0.3 | 0.3 | 0.3 | 0.3 | 0.3 | 0.3 | 0.3 | 0.3 | 0.3 |
| Acetylenol E60 | | | | | | | | | | | |
| Triethylene glycol | 5.0 | 5.0 | 5.0 | 5.0 | 5.0 | 5.0 | 5.0 | 5.0 | 5.0 | 5.0 | 5.0 |
| Diethylene glycol | | | | | | | | | | | |
| PEG600 | | | | | | | | | | | |
| PEG1000 | | | | | | | | | | | |
| Propylene glycol | | | | | | | | | | | |
| 1,2-hexanediol | | | | | | | | | | | |
| 1,6-hexanediol | | | | | | | | | | | |
| Ethylene glycol | | | | | | | | | | | |
| 2-naphthol(ppm) | | 0.6 | 0.75 | 250 | 260 | 50 | 50 | 50 | 50 | 50 | 50 |
| 2-hydroxy-1-naphthaldehyde(ppm) | | | | | | 50 | 50 | 50 | 50 | 50 | 50 |

TABLE 9-continued

Preparation and characteristics of ink

| | | | | | | | | | | | |
|---|---|---|---|---|---|---|---|---|---|---|---|
| Glycerin | 10.0 | 10.0 | 10.0 | 10.0 | 10.0 | 10.0 | 10.0 | 10.0 | 10.0 | 10.0 | 10.0 |
| Ion-exchanged water | 59.7 | 9.7 | 9.7 | 59.7 | 59.7 | 59.7 | 59.7 | 59.7 | 59.7 | 59.7 | 59.7 |
| Amount A of compound represented by general formula (3) (ppm) | 0 | 0.6 | 0.75 | 250 | 260 | 100 | 100 | 100 | 100 | 100 | 100 |
| Pigment content P (%) | 5.0 | 15.0 | 15.0 | 5.0 | 5.0 | 5.0 | 5.0 | 5.0 | 5.0 | 5.0 | 5.0 |
| Resin dispersant content B (%) | 1.5 | 4.5 | 4.5 | 1.5 | 1.5 | 1.5 | 1.5 | 1.5 | 1.5 | 1.5 | 1.5 |
| B/P (times) | 0.30 | 0.30 | 0.30 | 0.30 | 0.30 | 0.30 | 0.30 | 0.30 | 0.30 | 0.30 | 0.30 |
| Amount (ppm) of compound represented by general formula (3) based on pigment | 0 | 4 | 5 | 5,000 | 5,200 | 2,000 | 2,000 | 2,000 | 2,000 | 2,000 | 2,000 |

TABLE 10

Preparation and characteristics of ink

| | Example | | | | | | | Comparative example |
|---|---|---|---|---|---|---|---|---|
| | 64 | 65 | 66 | 67 | 68 | 69 | 70 | 1 |
| Type of pigment dispersion liquid | 34 | 35 | 36 | 37 | 38 | 39 | 44 | 45 |
| Pigment dispersion liquid | 25.0 | 25.0 | 25.0 | 25.0 | 55.0 | 57.5 | 25.0 | 25.0 |
| C.I. Basic Yellow 40 | | | | | | | | |
| Acetylenol E100 | 0.3 | 0.3 | 0.3 | 0.3 | 0.3 | 0.3 | | 0.3 |
| Acetylenol E60 | | | | | | | | |
| Triethylene glycol | 5.0 | 5.0 | 5.0 | 5.0 | 5.0 | 5.0 | | 5.0 |
| Diethylene glycol | | | | | | | | |
| PEG600 | | | | | | | | |
| PEG1000 | | | | | | | | |
| Propylene glycol | | | | | | | | |
| 1,2-hexanediol | | | | | | | | |
| 1,6-hexanediol | | | | | | | | |
| Ethylene glycol | | | | | | | | |
| 2-naphthol(ppm) | 50 | 50 | 50 | 50 | 50 | 50 | | 50 |
| 2-hydroxy-1-naphthaldehyde(ppm) | 50 | 50 | 50 | 50 | 50 | 50 | | 50 |
| Glycerin | 10.0 | 10.0 | 10.0 | 10.0 | 10.0 | 10.0 | 10.0 | 10.0 |
| Ion-exchanged water | 59.7 | 59.7 | 59.7 | 59.7 | 29.7 | 27.2 | 65.0 | 59.7 |
| Amount A of compound represented by general formula (3) (ppm) | 100 | 100 | 100 | 100 | 100 | 100 | 0 | 100 |
| Pigment content P (%) | 5.0 | 5.0 | 5.0 | 5.0 | 11.0 | 11.5 | 5.0 | 5.0 |
| Resin dispersant content B (%) | 1.5 | 1.5 | 0.20 | 0.25 | 22.0 | 24.2 | 0.20 | 1.5 |
| B/P (times) | 0.30 | 0.30 | 0.04 | 0.05 | 2.00 | 2.10 | 0.04 | 0.30 |
| Amount (ppm) of compound represented by general formula (3) based on pigment | 2,000 | 2,000 | 2,000 | 2,000 | 909 | 870 | 0 | 2,000 |

| | Comparative example | | | | | | |
|---|---|---|---|---|---|---|---|
| | 2 | 3 | 4 | 5 | 6 | 7 | 8 |
| Type of pigment dispersion liquid | 46 | 47 | 48 | 49 | 50 | 51 | 52 |
| Pigment dispersion liquid | 25.0 | 25.0 | 25.0 | 25.0 | 25.0 | 25.0 | 25.0 |
| C.I. Basic Yellow 40 | | | | | | | |
| Acetylenol E100 | 0.3 | 0.3 | 0.3 | 0.3 | 0.3 | 0.3 | 0.3 |
| Acetylenol E60 | | | | | | | |
| Triethylene glycol | 5.0 | 5.0 | 5.0 | 5.0 | 5.0 | 5.0 | 5.0 |
| Diethylene glycol | | | | | | | |
| PEG600 | | | | | | | |
| PEG1000 | | | | | | | |
| Propylene glycol | | | | | | | |
| 1,2-hexanediol | | | | | | | |
| 1,6-hexanediol | | | | | | | |
| Ethylene glycol | | | | | | | |
| 2-naphthol(ppm) | 50 | 50 | 50 | 50 | 50 | 50 | 50 |
| 2-hydroxy-1-naphthaldehyde(ppm) | 50 | 50 | 50 | 50 | 50 | 50 | 50 |

TABLE 10-continued

| Preparation and characteristics of ink | | | | | | | |
|---|---|---|---|---|---|---|---|
| Glycerin | 10.0 | 10.0 | 10.0 | 10.0 | 10.0 | 10.0 | 10.0 |
| Ion-exchanged water | 59.7 | 59.7 | 59.7 | 59.7 | 59.7 | 59.7 | 59.7 |
| Amount A of compound represented by general formula (3) (ppm) | 100 | 100 | 100 | 100 | 100 | 100 | 100 |
| Pigment content P (%) | 5.0 | 5.0 | 5.0 | 5.0 | 5.0 | 5.0 | 5.0 |
| Resin dispersant content B (%) | 1.5 | 1.5 | 1.5 | 1.5 | 1.5 | 1.5 | 1.5 |
| B/P (times) | 0.30 | 0.30 | 0.30 | 0.30 | 0.30 | 0.30 | 0.30 |
| Amount (ppm) of compound represented by general formula (3) based on pigment | 2,000 | 2,000 | 2,000 | 2,000 | 2,000 | 2,000 | 2,000 |

| | Comparative example | | | | | |
|---|---|---|---|---|---|---|
| | 9 | 10 | 11 | 12 | 15 | 16 |
| Type of pigment dispersion liquid | 53 | 54 | 55 | 56 | — | 59 |
| Pigment dispersion liquid | 25.0 | 25.0 | 25.0 | 25.0 | | 25.0 |
| C.I. Basic Yellow 40 | | | | | 0.5 | |
| Acetylenol E100 | 0.3 | 0.3 | 0.3 | 0.3 | 0.3 | 0.3 |
| Acetylenol E60 | | | | | | |
| Triethylene glycol | 5.0 | 5.0 | 5.0 | 5.0 | 5.0 | 5.0 |
| Diethylene glycol | | | | | | |
| PEG600 | | | | | | |
| PEG1000 | | | | | | |
| Propylene glycol | | | | | | |
| 1,2-hexanediol | | | | | | |
| 1,6-hexanediol | | | | | | |
| Ethylene glycol | | | | | | |
| 2-naphthol(ppm) | 50 | 50 | 50 | 50 | 50 | 50 |
| 2-hydroxy-1-naphthaldehyde(ppm) | 50 | 50 | 50 | 50 | 50 | 50 |
| Glycerin | 10.0 | 10.0 | 10.0 | 10.0 | 10.0 | 10.0 |
| Ion-exchanged water | 59.7 | 59.7 | 59.7 | 59.7 | 84.2 | 59.7 |
| Amount A of compound represented by general formula (3) (ppm) | 100 | 100 | 100 | 100 | 100 | 100 |
| Pigment content P (%) | 5.0 | 5.0 | 5.0 | 5.0 | 0.5 | 5.0 |
| Resin dispersant content B (%) | 0.0 | 1.5 | 1.5 | 1.5 | 0.0 | 1.5 |
| B/P (times) | 0.00 | 0.30 | 0.30 | 0.30 | 0.00 | 0.30 |
| Amount (ppm) of compound represented by general formula (3) based on pigment | 2,000 | 2,000 | 2,000 | 2,000 | 20,000 | 2,000 |

<Evaluation>

An ink cartridge was filled with each of the prepared inks and was mounted in an ink jet recording apparatus (trade name "PIXUS Pro-10", manufactured by CANON KABUSHIKI KAISHA) equipped with a recording head for ejecting ink by thermal energy. In the present exemplary embodiment, an image recorded with 8 drops of 3.8 ng±10% of ink per unit area of 1/600 inch×1/600 inch is defined as with a recording duty of 100%. The recording environment included a temperature of 25° C. and a relative humidity of 55%. In the present disclosure, in the evaluation criteria of the following items, "A" and "B" were acceptable, and "C" was unacceptable. Table 11 shows the evaluation results.

Chromaticity

The ink jet recording apparatus was used to record an image including the following gradation pattern on a recording medium (glossy paper, trade name "Canon Photo Paper Pro Luster", manufactured by CANON KABUSHIKI KAISHA). The gradation pattern is composed of a plurality of 2 cm×2 cm solid images in which the ink application amount is changed stepwise under the conditions that up to six drops of ink are applied to a unit area of 1/600 inch×1/600 inch. After the image was dried for one day, the maximum reflected light intensity, chroma (C*) and lightness (L*) were measured with a spectrophotometer (trade name "X-Rite eXact" (M1 light source), manufactured by X-Rite, Inc.). C* and L* are based on a color difference display method specified by Commission internationale de l'Eclairage (CIE). The image chromaticity was evaluated in accordance with the following evaluation criteria. The lightness was evaluated at a chroma of 50, When the maximum chroma did not reach 50, data obtained by measuring the gradation pattern was extrapolated, and the calculated lightness was used.

A: The maximum reflected light intensity was 100% or more. Furthermore, the maximum chroma C* was 70 or more and the lightness L* was 80 or more, or the maximum chroma C* was 65 or more and the lightness L* was 85 or more.

B: The maximum reflected light intensity was 100% or more, and the maximum chroma C* was 65 or more to less than 70 and the lightness L* was 80 or more to less than 85.

C: At least one of the following was found: a maximum reflected light intensity of less than 100%, a maximum chroma C* of less than 65 and a lightness L* of less than 80.

Ejection Stability

The ink jet recording apparatus was used to record a 19 cm×26 cm solid image with a recording duty of 100% on ten recording media (plain paper, trade name "GF-500", manufactured by CANON KABUSHIKI KAISHA). The solid images on the fifth and tenth sheets were visually inspected to evaluate ejection stability in accordance with the following evaluation criteria.
- A: No white streak or blurring was observed on the fifth sheet, and no (or slight) white streak or blurring was observed on the tenth sheet.
- B: No white streak or blurring was observed on the fifth sheet, but a white streak or blurring was observed on the tenth sheet.
- C: A white streak or blurring was observed on the fifth sheet.

Storage Stability

An ink was diluted 3,000 times with ion-exchanged water, and an absorption spectrum was measured to determine the maximum absorbance $A_0$ in the wavelength range of 380 to 700 nm. The absorption spectrum was measured with a spectrophotometer (trade name "U-3300", manufactured by Hitachi, Ltd.). Furthermore, a viscosity $V_0$ was measured with an E-type: viscometer (trade name "RE80-L", manufactured by Toki Sangyo Co., Ltd.) equipped with a rotor (1°34'×R24). An antifreeze in a constant temperature bath set at 25° C. was circulated through the E-type viscometer via a tube. The ink was then placed in an airtight container and was stored in an oven at 70° C. for 14 days. After the temperature was returned to 25° C. an absorption spectrum and the viscosity were measured in the same manner as described above, and the maximum absorbance $A_1$ in the wavelength range of 380 to 700 nm and the viscosity $V_1$ were measured. The rate of change in absorbance and viscosity due to the storage was calculated to evaluate the storage stability of the ink in accordance with the following evaluation criteria.
- A: The rate of change in the maximum absorbance was less than 2%, and the rate of increase in the viscosity was less than 3%.
- B: The rate of change in the maximum absorbance was 2% or more to less than 5% and the rate of increase in the viscosity was less than 5%, or the rate of change in the maximum absorbance was less than 2% and the rate of increase in the viscosity vas 3% or more to less than 5%.
- C: At least one of the rate of change in the maximum absorbance and the rate of increase in the viscosity was 5% or more.

TABLE 11

| | | Evaluation results | | |
|---|---|---|---|---|
| | | Chromaticity | Ejection stability | Storage stability |
| Example | 1 | A | A | A |
| | 2 | A | A | A |
| | 3 | A | A | A |
| | 4 | A | A | A |
| | 5 | A | A | A |
| | 6 | A | A | A |
| | 7 | A | A | A |
| | 8 | A | A | A |
| | 9 | A | A | A |
| | 10 | A | A | A |
| | 11 | A | A | A |
| | 12 | A | A | A |
| | 13 | A | A | A |
| | 14 | A | A | A |
| | 15 | A | A | A |
| | 16 | A | A | A |

TABLE 11-continued

| | | Evaluation results | | |
|---|---|---|---|---|
| | | Chromaticity | Ejection stability | Storage stability |
| | 17 | A | A | A |
| | 18 | A | A | A |
| | 19 | A | A | A |
| | 20 | A | A | A |
| | 21 | A | A | A |
| | 22 | A | A | A |
| | 23 | A | A | A |
| | 24 | A | A | A |
| | 25 | A | A | A |
| | 26 | A | A | A |
| | 27 | A | A | A |
| | 28 | A | A | A |
| | 29 | A | A | A |
| | 30 | A | A | A |
| | 31 | A | A | A |
| | 32 | A | A | A |
| | 33 | A | A | A |
| | 34 | B | A | A |
| | 35 | A | A | A |
| | 36 | B | A | A |
| | 37 | A | A | A |
| | 38 | A | A | A |
| | 39 | B | A | A |
| | 40 | B | B | A |
| | 41 | B | B | A |
| | 42 | B | A | A |
| | 43 | A | A | A |
| | 44 | A | A | A |
| | 45 | A | B | A |
| | 46 | A | B | A |
| | 47 | B | B | A |
| | 48 | B | B | A |
| | 49 | B | B | A |
| | 50 | B | B | A |
| | 51 | B | A | A |
| | 52 | B | A | A |
| | 53 | B | A | A |
| | 54 | B | A | A |
| | 55 | A | A | A |
| | 56 | A | A | A |
| | 57 | A | B | A |
| | 58 | B | B | B |
| | 59 | A | A | A |
| | 60 | A | A | A |
| | 61 | B | B | B |
| | 62 | B | B | B |
| | 63 | A | A | A |
| | 64 | A | A | A |
| | 65 | A | B | A |
| | 66 | B | B | B |
| | 67 | A | A | A |
| | 68 | A | A | A |
| | 69 | A | B | A |
| | 70 | B | B | B |
| Comparative Example | 1 | C | A | A |
| | 2 | C | A | A |
| | 3 | C | A | A |
| | 4 | C | A | A |
| | 5 | C | A | A |
| | 6 | C | A | A |
| | 7 | C | A | A |
| | 8 | C | A | A |
| | 9 | C | C | C |
| | 10 | C | C | C |
| | 11 | C | C | C |
| | 12 | C | C | C |
| | 13 | C | C | C |
| | 14 | A | A | C |
| | 15 | C | A | C |
| | 16 | A | C | C |

The evaluation results of the chromaticity and ejection stability of the image of Example 47 and 49 were rated "B" but were inferior to those of Examples 40, 41, 48 and 50, which had the same evaluation results. The evaluation results of Example 70 were all rated "B" but were all inferior to those of Examples 58, 61, 62 and 66, which had the same evaluation results.

The present disclosure can provide an aqueous ink for ink jet recording with high ejection stability and storage stability for recording an image with high chromaticity in a yellow region, an ink cartridge containing the aqueous ink and an ink jet recording method.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-056596 filed Mar. 30, 2022, and No. 2023-036748 filed Mar. 9, 2023, which are hereby incorporated by reference herein in their entirety.

What is claimed is:

1. An aqueous ink for ink jet recording comprising:
   a pigment comprising C.I. Pigment Yellow 101; and
   a resin dispersant that disperses the pigment,
   wherein the resin dispersant has a unit with an aromatic group and a unit with an anionic group.
2. The aqueous ink according to claim 1, wherein the pigment has a crystallite size of 30 nm or more.
3. The aqueous ink according to claim 1, wherein the pigment has a crystallite size of 100 nm or less.
4. The aqueous ink according to claim 1, wherein the pigment has an aspect ratio of 3.0 times or less.
5. The aqueous ink according to claim 1, wherein the pigment has an aspect ratio of 1.1 times or more.
6. The aqueous ink according to claim 1, wherein the pigment has a span value of 1.0 time or more to 3.0 times or less.
7. The aqueous ink according to claim 1, wherein the pigment has a cumulative 50% particle size of 200 nm or less on a volume basis.
8. The aqueous ink according to claim 1, wherein the pigment has a cumulative 50% particle size of 40 nm or more on a volume basis.
9. The aqueous ink according to claim 1, wherein a pigment content of the ink is 0.5% by mass or more to 15.0% by mass or less based on a total mass of the ink.
10. The aqueous ink according to claim 1, further comprising at least one compound selected from the group consisting of compounds represented by formula (1) and compounds represented by formula (2):

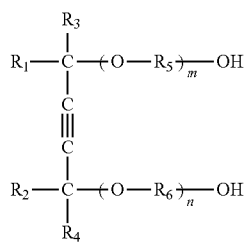

(1)

wherein $R_1$, $R_2$, $R_3$ and $R_4$ independently denote a hydrogen atom or an alkyl group having 1 to 5 carbon atoms, $R_5$ and $R_6$ independently denote an alkylene group having 1 to 5 carbon atoms, and m and n independently denote an integer of 0 or more,

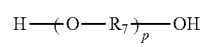

(2)

wherein $R_7$ denotes an alkylene group having 2 to 6 carbon atoms, and p denotes an integer of 2 or more when $R_7$ denotes an alkylene group having 2 carbon atoms, or denotes an integer of 1 or more when $R_7$ denotes an alkylene group other than the alkylene group having 2 carbon atoms.

11. The aqueous ink according to claim 1, further comprising a compound represented by formula (3):

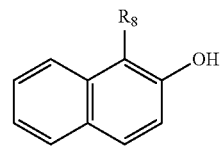

(3)

wherein $R_8$ denotes a hydrogen atom or a formyl group.

12. The aqueous ink according to claim 11, wherein an amount of compound represented by formula (3) in the ink is 5 ppm or more to 5,000 ppm or less based on a pigment content.
13. The aqueous ink according to claim 1, wherein the resin dispersant has an acid value of 50 mg KOH/g or more to 200 mg KOH/g or less.
14. The aqueous ink according to claim 1, wherein the resin dispersant has a weight-average molecular weight of 1,000 or more to 30,000 or less.
15. The aqueous ink according to claim 1, wherein an amount (% by mass) of a resin dispersant is 0.05 times or more to 2.00 times or less an amount (% by mass) of a pigment in terms of a mass ratio.
16. The aqueous ink according to claim 1, wherein the resin dispersant is selected from the group consisting of an acrylic resin, a urethane resin, and a urea resin.
17. The aqueous ink according to claim 1, wherein the unit with the aromatic group is selected from the group consisting of styrene, α-methylstyrene, and benzyl (meth)acrylate.
18. The aqueous ink according to claim 1, wherein the anionic group is selected from the group consisting of a carboxylic acid group, a phenolic hydroxy group, and a phosphate group.
19. An ink cartridge comprising an ink; and an ink storage portion storing the ink,
   wherein the ink comprises the aqueous ink according to claim 1.
20. An ink jet recording method of recording an image onto a recording medium by ejecting an ink from an ink jet recording head,
   wherein the ink comprises the aqueous ink according to claim 1.

* * * * *